(12) United States Patent
Kim et al.

(10) Patent No.: US 12,319,307 B2
(45) Date of Patent: Jun. 3, 2025

(54) METHOD AND APPARATUS FOR PROVIDING DRIVER INTERFACE

(71) Applicant: 42DOT INC., Seoul (KR)

(72) Inventors: Ji Hoon Kim, Seoul (KR); Tae Suk Kim, Yongin (KR); Mo Ran Kim, Seongnam (KR); Jung Hee Son, Seongnam (KR); Su Ho Kim, Seoul (KR); Yoo Ra Choi, Seoul (KR); Hyun Woo Choi, Uiwang (KR); Dong Hoo Kim, Gunpo (KR); Zzy Hyun Oh, Seoul (KR); Jae In Chang, Seoul (KR); Da Ye Kwon, Hanam (KR); Hyun Gul Roh, Seongnam (KR); Man Gyu Park, Seoul (KR)

(73) Assignee: 42DOT INC., Seoul (KR)

( * ) Notice: Subject to any disclaimer, the term of this patent is extended or adjusted under 35 U.S.C. 154(b) by 38 days.

(21) Appl. No.: 18/347,651

(22) Filed: Jul. 6, 2023

(65) Prior Publication Data

US 2024/0010220 A1    Jan. 11, 2024

(30) Foreign Application Priority Data

Jul. 8, 2022    (KR) .................. 10-2022-0084456
Jul. 8, 2022    (KR) .................. 10-2022-0084457
(Continued)

(51) Int. Cl.
*B60W 50/14*    (2020.01)
*G07C 5/06*    (2006.01)
(Continued)

(52) U.S. Cl.
CPC .............. *B60W 50/14* (2013.01); *G07C 5/06* (2013.01); *G08G 1/096855* (2013.01); *B60W 60/001* (2020.02)

(58) Field of Classification Search
CPC ....... B60W 50/14; B60W 60/001; G07C 5/06; G08G 1/096855
See application file for complete search history.

(56) References Cited

U.S. PATENT DOCUMENTS 10,474,357 B2 * 11/2019 Bouaziz ................ G06F 3/0488
11,225,258 B2 * 1/2022 Matsunami ............. B60Q 1/52
(Continued)

FOREIGN PATENT DOCUMENTS

JP         11-252154 A      9/1999
JP         11283191 A   *  10/1999
(Continued)

OTHER PUBLICATIONS

KR Office Action dated Oct. 31, 2024.

*Primary Examiner* — Mohamed Barakat
(74) *Attorney, Agent, or Firm* — Harvest IP Law, LLP

(57) ABSTRACT

Provided are a method and apparatus for providing a driver interface. The method of providing a driver interface may include, based on a state of a vehicle, determining a main interface configured to display information regarding a vehicle operation service, and generating the determined main interface, wherein the generating of the main interface may include determining a before-starting-work interface as the main interface, in response to the state of the vehicle being switched to a moving-to-workplace state, determining a moving-to-workplace interface as the main interface, and in response to the state of the vehicle being switched to a standby-for-dispatch state, determining a standby-for-dispatch interface as the main interface.

8 Claims, 19 Drawing Sheets

(30) Foreign Application Priority Data

Jul. 8, 2022 (KR) ........................ 10-2022-0084557
Jul. 8, 2022 (KR) ........................ 10-2022-0084560

(51) Int. Cl.
*G08G 1/0968* (2006.01)
*B60W 60/00* (2020.01)

(56) References Cited

U.S. PATENT DOCUMENTS

| | | | |
|---|---|---|---|
| 2017/0045009 A1* | 2/2017 | Ueda | F02D 41/3005 |
| 2018/0137742 A1* | 5/2018 | Zhang | G08G 1/205 |
| 2021/0223051 A1* | 7/2021 | Hochberg | G01C 21/3492 |
| 2023/0050337 A1* | 2/2023 | Kim | G01C 21/3691 |

FOREIGN PATENT DOCUMENTS

| | | |
|---|---|---|
| KR | 19960002107 A | 1/1996 |
| KR | 20050005763 A | 1/2005 |
| KR | 20050060900 A | 6/2005 |
| KR | 20090101706 A | 9/2009 |
| KR | 101548921 B1 | 9/2015 |
| KR | 10-2016-0000921 A | 1/2016 |
| KR | 20160056118 A | 5/2016 |
| KR | 101669167 B1 | 10/2016 |
| KR | 20170116433 A | 10/2017 |
| KR | 10-2018-0002266 A | 1/2018 |
| KR | 20180052451 A | 5/2018 |
| KR | 20180114302 A | 10/2018 |
| KR | 10-2019-0107278 A | 9/2019 |
| KR | 20200055974 A | 5/2020 |
| KR | 20200079111 A | 7/2020 |
| KR | 20210005450 A | 1/2021 |
| KR | 20210009491 A | 1/2021 |
| KR | 20220022754 A | 2/2022 |
| KR | 20220036923 A | 3/2022 |
| KR | 10-2022-0043986 A | 4/2022 |
| KR | 20220072816 A | 6/2022 |
| KR | 20220095619 A | 7/2022 |

* cited by examiner

METHOD AND APPARATUS FOR PROVIDING DRIVER INTERFACE

CROSS-REFERENCE TO RELATED APPLICATION

This application claims the benefit of Korean Patent Application No. 10-2022-0084456, filed on Jul. 8, 2022, in the Korean Intellectual Property Office, Korean Patent Application No. 10-2022-0084457, filed on Jul. 8, 2022, in the Korean Intellectual Property Office, Korean Patent Application No. 10-2022-0084557, filed on Jul. 8, 2022, in the Korean Intellectual Property Office, and Korean Patent Application No. 10-2022-0084560, filed on Jul. 8, 2022, in the Korean Intellectual Property Office, the disclosure of which is incorporated herein in its entirety by reference.

BACKGROUND

1. Field

The disclosure relates to a method and apparatus for providing a driver interface.

2. Description of the Related Art

Existing transportation means include buses, subways, and taxis. For subways, the fee is inexpensive, but it is inconvenient for passengers to go directly to a designated area and ride a train at a set time. Taxis allow passengers to get on and off wherever they want, but the fee is expensive.

In general cities, passengers may freely use transportation means such as buses, subways, and taxis, but in remote areas such as countryside, taxis do not operate or buses operate only three or four times a day, and accordingly, access to the existing transportation means is reduced.

Demand-responsive transport (DRT) has emerged as a transportation means that supplements merits and drawbacks of these existing transportation means. DRT refers to a transportation means in which an operation section, frequency of operation, and operation time may be flexibly managed according to demands of users without fixed routes.

Recently, research on methods of operating DRT systems more efficiently is required.

The aforementioned background art is technical information that the inventors possessed for derivation of the present disclosure or obtained during a derivation process of the present disclosure, and may not be referred to as known art disclosed to the general public prior to filing the present disclosure.

SUMMARY

The disclosure is to provide a method and apparatus for providing a driver interface. The problems to be solved by the present disclosure are not limited to the aforementioned problems, and other problems and advantages of the present disclosure that are not mentioned may be understood by the following description and will be more clearly understood by the embodiments of the present disclosure. In addition, it will be appreciated that the problems and advantages to be solved by the present disclosure may be implemented by means indicated in the claims and combinations thereof.

Additional aspects will be set forth in part in the description which follows and, in part, will be apparent from the description, or may be learned by practice of the presented embodiments.

According to a first aspect of the disclosure, there may be provided a connection method for vehicle operation service, the connection method including receiving an input of a first identifier corresponding to information about a vehicle service provider, requesting verification of the first identifier and registration of a preliminary connection apparatus, in response to completion of the verification of the first identifier, receiving an input of a second identifier corresponding to equipment-specific information, requesting completion of verification of the second identifier and registration of a vehicle, and in response to completion of the verification of the second identifier, activating interfaces corresponding to the information about the vehicle service provider and the equipment-specific information.

According to a second aspect of the disclosure, there may be provided a connection apparatus for vehicle operation service, the connection apparatus including a memory storing at least one program, and a processor configured to operate by executing the at least one program, wherein the processor is configured to receive an input of a first identifier corresponding to information about a vehicle service provider, request verification of the first identifier and registration of a preliminary connection apparatus, in response to completion of the verification of the first identifier, receive an input of a second identifier corresponding to equipment-specific information, request completion of verification of the second identifier and registration of a vehicle, and in response to completion of the verification of the second identifier, activate interfaces corresponding to the information about the vehicle service provider and the equipment-specific information.

According to a third aspect of the disclosure, there may be provided a method of providing a driver interface, the method including, based on a state of a vehicle, determining a main interface configured to display information regarding a vehicle operation service, and generating the determined main interface, wherein the generating of the main interface includes determining a before-starting-work interface as the main interface, in response to the state of the vehicle being switched to a moving-to-workplace state, determining a moving-to-workplace interface as the main interface, and in response to the state of the vehicle being switched to a standby-for-dispatch state, determining a standby-for-dispatch interface as the main interface.

According to a fourth aspect of the disclosure, there may be provided an apparatus for providing a driver interface, the apparatus including a memory storing at least one program, and a processor configured to operate by executing the at least one program, wherein the processor is configured to, based on a state of a vehicle, determine a main interface configured to display information regarding a vehicle operation service, and generate the determined main interface, wherein the generating of the main interface includes determining a before-starting-work interface as the main interface, in response to the state of the vehicle being switched to a moving-to-workplace state, determining a moving-to-workplace interface as the main interface, and in response to the state of the vehicle being switched to a standby-for-dispatch state, determining a standby-for-dispatch interface as the main interface.

According to a fifth aspect of the disclosure, there may be provided a method of providing a vehicle operation information interface, the method including, based on a state of a vehicle, determining a main interface configured to display information regarding a vehicle operation service, and generating the determined main interface, wherein the determining of the main interface includes determining a standby-for-dispatch interface as the main interface, and in response to the state of the vehicle being switched to a moving-to-pick-up-location state, determining a moving-to-pick-up-location interface as the main interface, and the standby-for-dispatch interface includes a driving route interface configured to display a surrounding environment of the vehicle, a route guidance interface including a navigation map, a notification interface configured to display a notification related to operation assignment of the vehicle, and an autonomous driving function state interface.

According to a sixth aspect of the disclosure, there may be provided an apparatus for providing a vehicle operation information interface, the apparatus including a memory storing at least one program, and a processor configured to operate by executing the at least one program, wherein the processor is configured to, based on a state of a vehicle, determine a main interface that is an interface configured to display information regarding a vehicle operation service, and generate the determined main interface, wherein the determining of the main interface includes determining a standby-for-dispatch interface as the main interface, and in response to the state of the vehicle being switched to a moving-to-pick-up-location state, determining a moving-to-pick-up-location interface as the main interface, and the standby-for-dispatch interface includes a driving route interface configured to display a surrounding environment of the vehicle, a route guidance interface including a navigation map, a notification interface configured to display a notification related to operation assignment of the vehicle, and an autonomous driving function state interface.

According to a seventh aspect of the disclosure, there may be provided a method of providing an interface for vehicle operation, the method including collecting data including information about a vehicle, a state of the vehicle, location information about the vehicle, information about a destination, or a signal generated by an apparatus mounted in the vehicle, and based on the collected data, generating a driver interface displayed on a driver information providing apparatus and an external display interface displayed on an external display apparatus.

According to an eighth aspect of the disclosure, there may be provided an apparatus of providing an interface for vehicle operation, the apparatus including a memory storing at least one program, and a processor configured to operate by executing the at least one program, wherein the processor is configured to collect data including information about a vehicle, a state of the vehicle, location information about the vehicle, information about a destination, or a signal generated by an apparatus mounted in the vehicle, and based on the collected data, generate a driver interface displayed on a driver information providing apparatus and an external display interface displayed on an external display apparatus.

According to a ninth aspect of the disclosure, there may be provided a computer-readable recording medium having recorded thereon a program for executing the method according to the first, third, fifth, or seventh aspect, on a computer.

DETAILED DESCRIPTION

Figure 1:
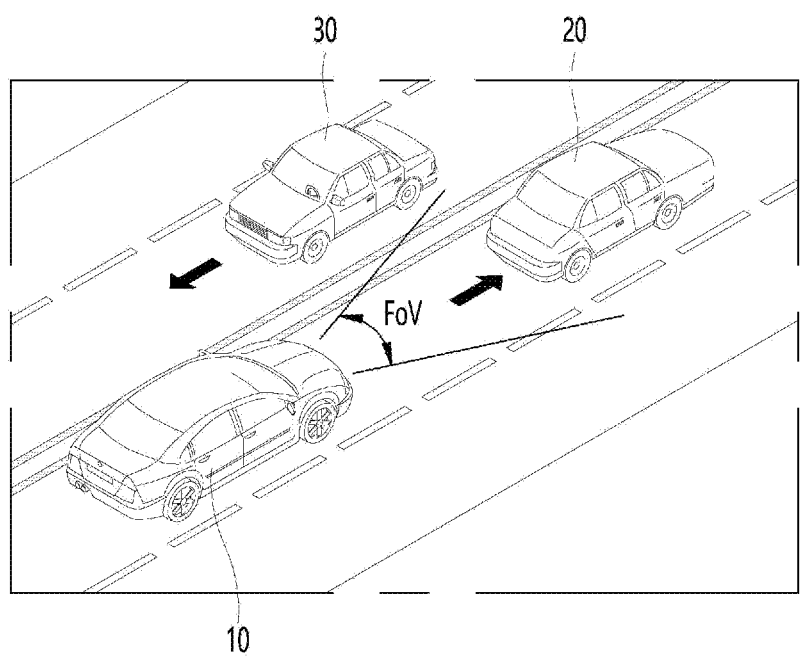
FIG. 1 is a diagram for describing an autonomous driving method according to an embodiment.

The advantages and features of the disclosure and methods of achieving them will become apparent with reference to embodiments of the disclosure described in detail below with reference to the accompanying drawings. However, it should be understood that the disclosure is not limited to embodiments set forth below, but may be implemented in a variety of different forms, and includes all modifications, equivalents, and substitutes included in the spirit and scope of the disclosure. The embodiments set forth below are provided so that the disclosure will be thorough and complete, and fully convey the scope of the disclosure to one of ordinary skill in the art. In describing the disclosure, when a detailed description of relevant well-known technologies is determined to unnecessarily obscure the gist of the disclosure, the detailed description thereof may be omitted.

Terms used herein are only used for the purpose of describing certain embodiments and are not intended to be limiting of the disclosure. An expression used in the singular encompasses the expression in the plural, unless it has a clearly different meaning in the context. It should be understood that terms used herein, such as "comprise", "include", or "have", are intended to specify the presence of features, numbers, steps, operations, components, parts, or combinations thereof described in the specification, and do not exclude in advance the presence or addition of one or more other features, numbers, steps, operations, components, parts, or combinations thereof.

Some embodiments of the disclosure may be represented by functional block configurations and various processing operations. Some or all of the functional blocks may be implemented by various numbers of hardware and/or software configurations for performing certain functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented in an algorithm executed by one or more processors. Also, the disclosure may employ prior art for electronic environment setting, signal processing, and/or data processing. Terms such as "mechanism", "element", "means", and "component" may be used broadly and are not limited to mechanical and physical components.

Also, lines or members connecting elements illustrated in the drawings are merely illustrative of functional connections and/or physical or circuit connections. In an actual apparatus, connections between components may be represented by various functional connections, physical connections, or circuit connections that are replaceable or added.

Vehicles may include all types of transportation means used to transport people or objects with engines, such as cars, buses, motorcycles, kickboards, or trucks.

Hereinafter, the disclosure will be described in detail with reference to the accompanying drawings.

FIG. 1 is a diagram for describing an autonomous driving method according to an embodiment.

Referring to FIG. 1, the autonomous driving apparatus according to an embodiment of the disclosure is mounted in a vehicle, such that an autonomous vehicle 10 may be implemented. The autonomous driving apparatus mounted in the autonomous vehicle 10 may include various sensors for collecting surrounding situation information. For example, the autonomous driving apparatus may detect movement of a preceding vehicle 20 driving in front of the autonomous vehicle 10, through an image sensor and/or an event sensor mounted in the front of the autonomous vehicle 10. The autonomous driving apparatus may further include sensors for detecting the front of the autonomous vehicle 10, another driving vehicle 30 operating in a next lane, and pedestrians around the autonomous vehicle 10.

At least one of the sensors for collecting surrounding situation information about the autonomous vehicle 10 may have a certain field of view (FoV), as shown in FIG. 1. For example, when a sensor mounted on the front of the autonomous vehicle 10 has a FoV as shown in FIG. 1, information detected from the center of the sensor may have relatively high importance. This may be because the information detected from the center of the sensor includes most of information corresponding to the movement of the preceding vehicle 20.

The autonomous driving apparatus may control movement of the autonomous vehicle 10 by processing information collected by the sensors of the autonomous vehicle 10 in real time, and may also store at least some pieces of the information collected by the sensors in a memory apparatus.

Figure 2:
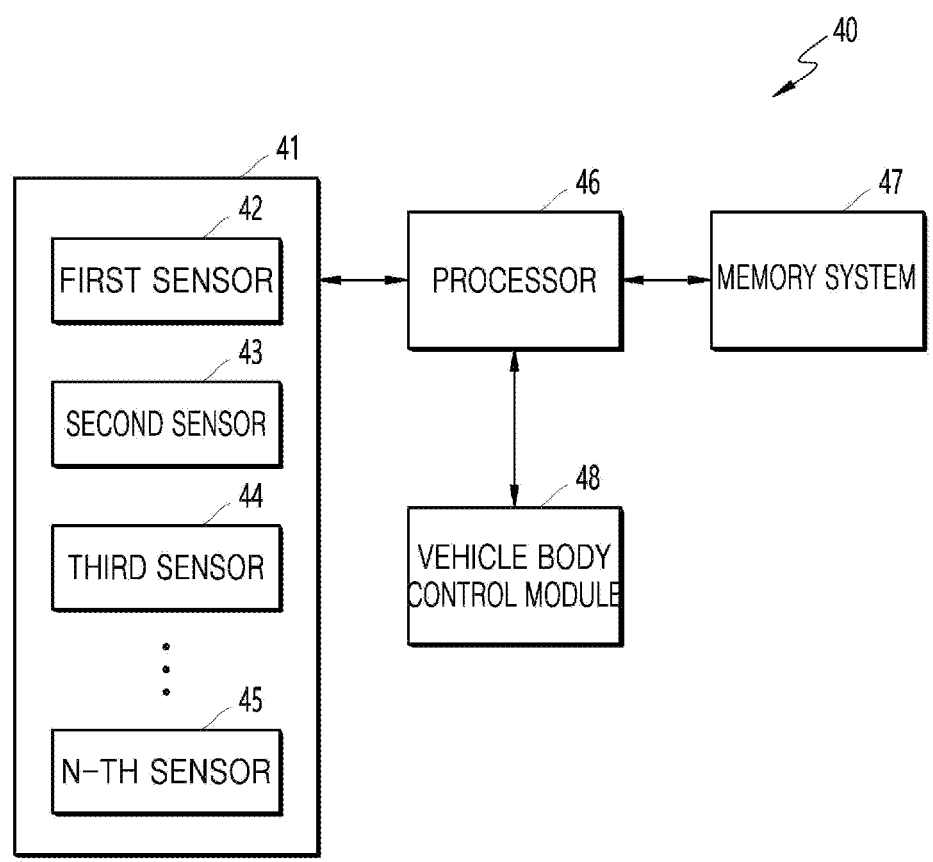
FIG. 2 is a block diagram illustrating hardware included in an autonomous driving apparatus, according to an embodiment.

FIG. 2 is a block diagram illustrating hardware included in an autonomous driving apparatus, according to an embodiment.

Referring to FIG. 2, an autonomous driving apparatus 40 may include a sensor unit 41, a processor 46, a memory system 47, and a vehicle body control module 48. The sensor unit 41 may include a plurality of sensors 42 to 45, and the plurality of sensors 42 to 45 may include an image sensor, an event sensor, an illuminance sensor, a global positioning system (GPS) apparatus, an acceleration sensor, or the like.

Data collected by the sensors 42 to 45 may be transmitted to the processor 46. The processor 46 may store the data collected by the sensors 42 to 45 in the memory system 47 and determine movement of a vehicle by controlling the vehicle body control module 48 based on the data collected by the sensors 42 to 45. The memory system 47 may include two or more memory apparatuses and a system controller for controlling the memory apparatuses. Each of the memory apparatuses may be provided as a single semiconductor chip.

In addition to the system controller of the memory system 47, each of the memory apparatuses included in the memory system 47 may include a memory controller. The memory controller may include an artificial intelligence (AI) computing circuit such as a neural network. The memory controller may generate calculation data by assigning a certain weight to data received from the sensors 42 to 45 or the processor 46 and store the calculation data in a memory chip.

The autonomous driving apparatus 40 may be mounted in a demand-responsive vehicle to be described below.

Figure 3:
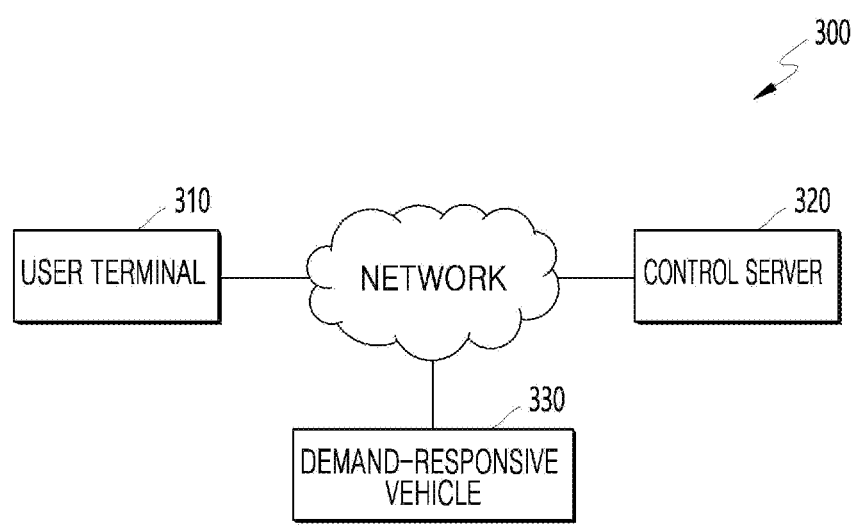
FIG. 3 is a diagram for describing a demand-responsive transport (DRT) system according to an embodiment.

FIG. 3 is a diagram for describing a demand-responsive transport (DRT) system according to an embodiment.

DRT refers to a transportation means in which an operation section, frequency of operation, and operation time may be flexibly managed according to demands of users without fixed routes.

The DRT may be classified into various types according to a route operation method. For example, a fixed route type is a type in which an operation time, stops, and a starting point/end point are all fixed. An off-route type is a type in which an operation time and a starting point/end point are fixed, but in terms of stops, new stops may be set in addition to fixed stops, according to user reservation. In a quasi-dynamic type, a starting point/end point are fixed, but for the operation time, only departure time and arrival time are fixed, and stops other than the starting point/end point may be freely set. A dynamic type is a type in which all of the operation time, stops, and starting point/end point are not fixed.

Also, the DRT may be classified into various types according to the number of starting points/end points. For example, a one-to-one type is a type in which a vehicle starts at one point and moves to another point. In addition, a one-to-many type is a type in which the vehicle moves from one departure point to a plurality of destinations, and a many-to-one type is a type in which the vehicle moves from a plurality of departure points to one destination. Also, a many-to-many type is a type in which there is no starting point/end point and departure points and destinations may be changed according to circumstances or needs.

Referring to FIG. 3, a DRT system 300 may include a user terminal 310, a control server 320, and a demand-responsive vehicle 330.

The user terminal 310 may refer to a terminal of a user (hereinafter, referred to as a "service user") who wants to use the DRT system 300. In the disclosure, the user terminal 310 may have the same meaning as a service user apparatus. A service user application may be installed on the user terminal 310, the application being configured to transmit or receive various types of information and provide interfaces for a service user to use the DRT system 300. In other words, the user terminal 310 may refer to a terminal on which the service user application is installed.

The service user may be provided with a dispatch service in which pick-up and drop-off locations are determined through the user terminal 310 and a vehicle is assigned based on the pick-up and drop-off locations. Also, the service user may be provided with dispatch information through the user terminal 310 until he or she boards the assigned vehicle. In addition, the service user may be provided with operation information regarding a vehicle that he or she has boarded, through the user terminal 310.

The user terminal 310 may receive an input of the service user through an application and transmit data to the control server 320 or the demand-responsive vehicle 330 based on the received input, and receive data from the control server 320 or the demand-responsive vehicle 330 and provide the service to the service user through the application.

The user terminal 310 may include a smartphone, a tablet personal computer (PC), a smart television (TV), a mobile phone, a personal digital assistant (PDA), a laptop computer, a media player, a micro-server, a GPS apparatus, an electronic book terminal, a digital broadcasting terminal, a navigation apparatus, a kiosk, an MP3 player, a digital camera, a home appliance, a camera-mounted device, or other mobile or non-mobile computing apparatuses, but is not limited thereto. Also, the user terminal 310 may include a wearable device having a communication function and data processing function, such as a watch, glasses, a hair band, or a ring, but is not limited thereto.

The control server 320 refers to a server that performs a control function for operating DRT. The control server 320 may transmit or receive data to or from the user terminal 310 and provide the use of the DRT system 300 to the service user. Also, the control server 320 may transmit or receive data to or from the demand-responsive vehicle 330 and maintain, repair, manage, or control the DRT system 300.

The control server 320 may store information or data required to implement the DRT system 300, including information regarding the service user, information regarding a vehicle service provider (e.g., a vehicle operating corporation) that operates DRT, information regarding an affiliated driver of the vehicle service provider, information regarding work of the affiliated driver, and information regarding a demand-responsive vehicle.

An information providing apparatus for control may be provided, which is a part of the control server 320 or connected to the control server 320, and which may be used by an administrator of the control server 320 in order for functions of the control server 320 to be performed. The information providing apparatus for control may provide a control interface through which the administrator of the control server 320 may interact.

The demand-responsive vehicle 330 refers to a vehicle that provides transportation to the service user according to a DRT operation method under control by the control server 320. The demand-responsive vehicle 330 may be a vehicle that is assigned according to a user demand and whose operation section, frequency of operation, and operation time are determined according to the DRT operation method.

The demand-responsive vehicle 330 may include a driver information providing apparatus, a passenger information providing apparatus, or an external display apparatus of a vehicle.

The driver information providing apparatus may refer to an apparatus which is a part of the demand-responsive vehicle 330 or connected to the demand-responsive vehicle 330, and which may be used by a driver who has boarded the demand-responsive vehicle 330 and directly drives or assists autonomous driving of the demand-responsive vehicle 330. Alternatively, the driver information providing apparatus may be a part of the autonomous driving apparatus mounted in the demand-responsive vehicle 330 or an apparatus connected to the autonomous driving apparatus. The driver information providing apparatus may provide, to the driver, information regarding a demand-responsive vehicle that the driver has boarded, and transmit data to the control server 320 in response to interacting with the driver.

The passenger information providing apparatus may refer to an apparatus which is a part of the demand-responsive vehicle 330 or connected to the demand-responsive vehicle 330, and which may be used by a service user (hereinafter, referred to as a "passenger") who boards the demand-responsive vehicle 330. Alternatively, the passenger information providing apparatus may be a part of the autonomous driving apparatus mounted in the demand-responsive vehicle 330 or an apparatus connected to the autonomous driving apparatus. The passenger information providing apparatus may be configured to provide, to the passenger, information regarding a demand-responsive vehicle that the passenger has boarded and interact with the passenger.

The external display apparatus may refer to an apparatus which is a part of the demand-responsive vehicle 330 or connected to the demand-responsive vehicle 330, and which may display information to the outside of the demand-responsive vehicle 330. Alternatively, the external display apparatus may be a part of the autonomous driving apparatus mounted in the demand-responsive vehicle 330 or an apparatus connected to the autonomous driving apparatus. The external display apparatus may be associated with the driver information providing apparatus or the passenger information providing apparatus, and may be configured to display various types of information on the outside of the demand-responsive vehicle 330.

The user terminal 310, the control server 320, and the demand-responsive vehicle 330 may perform communication using a network. For example, the network may include a local area network (LAN), a wide area network (WAN), a value added network (VAN), a mobile radio communication network, a satellite communication network, and combinations thereof, may be a comprehensive data communication network that allows each network constituent entity shown in FIG. 3 to smoothly communicate with each other, and may include a wired Internet network, a wireless Internet network, and a mobile wireless communication network. Also, examples of wireless communication may include wireless fidelity (Wi-Fi), Bluetooth, Bluetooth low energy, Zigbee, Wi-Fi direct (WFD), ultra-wideband (UWB), infrared data association (IrDA), near field communication (NFC), etc., but are not limited thereto.

Figure 4:
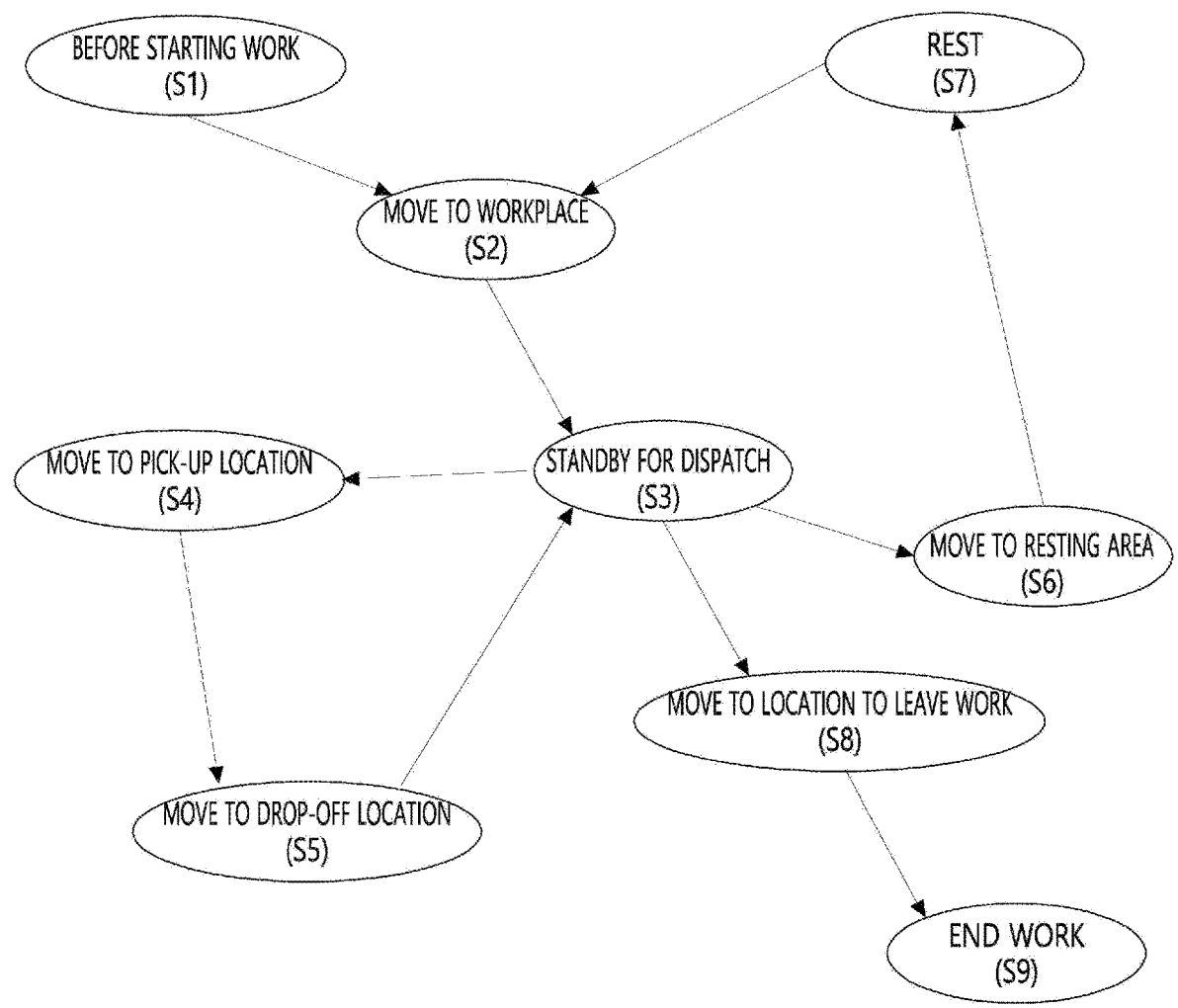
FIG. 4 is a state diagram for describing a process of providing operation of a demand-responsive vehicle and a change in a state of the demand-responsive vehicle in a DRT system, according to an embodiment.

FIG. 4 is a state diagram for describing a process of providing operation of a demand-responsive vehicle and a change in a state of the demand-responsive vehicle in a DRT system, according to an embodiment.

Each state shown in FIG. 4 refers to one of states that the demand-responsive vehicle may have in a process of operating the demand-responsive vehicle in the DRT system. Hereinafter, the term "vehicle" may be interpreted as a meaning including a demand-responsive vehicle.

In the disclosure, a vehicle state may be automatically switched based on a specific condition such as a vehicle location.

In the disclosure, a before-starting-work state S1 may refer to a vehicle state before a driver boards a vehicle and authenticates attendance. The driver may work according to a work plan corresponding to work information stored in the control server. In an embodiment, the vehicle state may be set or initialized to the before-starting-work state S1, in response to time remaining as much as a threshold time or less until a work start time included in the work information stored in the control server.

In the disclosure, a moving-to-workplace state S2 may refer to a vehicle state when a vehicle that is not present at a workplace is moving to the workplace. In an embodiment, the moving-to-workplace state S2 may refer to a vehicle state that is switched from the before-starting-work state S1 when the driver of the vehicle completes attendance authentication. In an embodiment, the workplace may refer to an arbitrary point on an autonomous driving route.

In the disclosure, a standby-for-dispatch state S3 may refer to a vehicle state when the vehicle is present on an autonomous driving route and may be assigned to operate, but has not yet been assigned.

In the disclosure, a moving-to-pick-up-location state S4 may refer to a vehicle state when the vehicle is assigned to operate and moves to a pick-up location where a passenger is agreed to board. In the disclosure, when the vehicle has been assigned to operate, it may correspond to a case in which dispatch has been completed for a service user. In the disclosure, even though the vehicle is assigned to operate, the operation may be canceled by the driver, the control server, or the passenger who has been agreed to board.

In the disclosure, a moving-to-drop-off-location state S5 may refer to a vehicle state when the passenger has boarded the vehicle and the vehicle moves to a drop-off location where the passenger is agreed to get off.

In an embodiment, when the vehicle state is in the moving-to-drop-off-location state S5, the vehicle state may be switched to the standby-for-dispatch state S3 in response to the passenger getting off at the drop-off location.

In the disclosure, a moving-to-resting-area state S6 may refer to a vehicle state when the driver drives the vehicle and moves to a resting area to take a rest. In an embodiment, the vehicle state may be switched to the moving-to-resting-area state S6 based on a rest plan included in the work plan corresponding to the work information stored in the control server.

In the disclosure, a resting state S7 may refer to a vehicle state when the vehicle has moved to the resting area and the driver is taking a rest.

In an embodiment, when the vehicle state is in the resting state S7, the vehicle state may be switched to the moving-to-workplace state S2 in response to the end of rest time of the driver.

In the disclosure, a moving-to-location-to-leave-work state S8 may refer to a vehicle state when a vehicle that is not present at a location to leave work is moving to the location to leave work. In an embodiment, the vehicle state may be switched to the moving-to-location-to-leave-work state S8 based on the work plan corresponding to the work information stored in the control server.

In the disclosure, a work-end state S9 may refer to a vehicle state when the driver has ended work and moved to the location to leave work. In an embodiment, when the vehicle is in the moving-to-location-to-leave-work state S8, the vehicle state may be switched to the work-end state S9 when the vehicle arrives at the location to leave work.

Each state shown in FIG. 4 is provided as an example, and in addition to the states shown, the states of the demand-responsive vehicle may be arbitrarily and appropriately configured according to a type of the demand-responsive vehicle, the nature of a route, and an operation method, and some of the states shown may also be omitted. As an example, when the demand-responsive vehicle is a van, the standby-for-dispatch state S3 may not exist, and the moving-to-pick-up-location state S4 and the moving-to-drop-off-location state S5 may be the same state. As another example, when the rest plan is not included in the work plan of the driver, the moving-to-resting-area state S6 and the resting state S7 may not exist.

Also, switching between the states of the vehicle, indicated by arrows in FIG. 4, may be performed differently from those shown in FIG. 4. As an example, when operation assignment is canceled in the moving-to-pick-up-location state S4, the state may be directly switched to the standby-for-dispatch state S3 rather than to the moving-to-drop-off-location state S5.

Hereinafter, a connection process for vehicle operation is described as a preliminary task to be performed by a driver to drive a vehicle.

In the disclosure, the connection process for vehicle operation may be performed through a connection apparatus for vehicle operation, and the connection apparatus for vehicle operation may refer to an apparatus on which driver software is installed.

In the disclosure, the connection process for vehicle operation may refer to a process in which a driver connects an apparatus that he or she owns to a vehicle and enables the vehicle to be used to provide a DRT service. The connection process for vehicle operation may include a process for verifying or registering whether a demand-responsive vehicle or a driver boarding the demand-responsive vehicle is suitable to provide the DRT service, whether the demand-responsive vehicle or the driver is scheduled to provide the DRT service, etc.

According to an embodiment of the disclosure, according to the connection process for vehicle operation, the driver may connect the apparatus having the driver software installed thereon to the demand-responsive vehicle and use the demand-responsive vehicle for the DRT service, without the need for an apparatus connected to or mounted in the demand-responsive vehicle to be an apparatus that has been verified or distributed by the control server. Also, when an apparatus previously connected to the demand-responsive vehicle (or an apparatus as a part of the demand-responsive vehicle) fails, emergency situations may be flexibly handled as long as there is an apparatus on which the driver software is installed.

Figure 5:
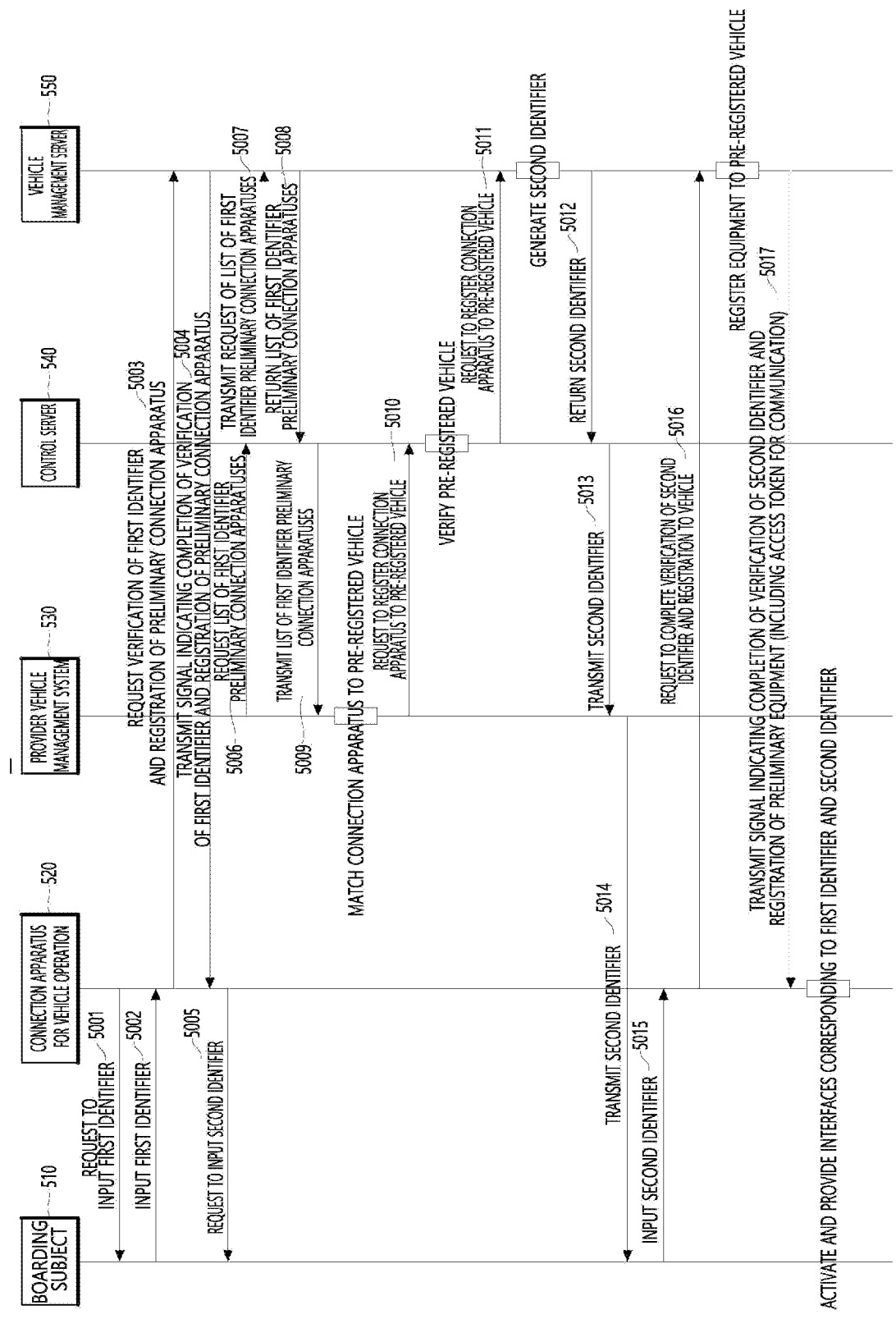
FIG. 5 is a diagram illustrating a connection process for vehicle operation, according to an embodiment.

FIG. 5 is a diagram illustrating a connection process for vehicle operation, according to an embodiment.

Referring to FIG. 5, in the disclosure, a connection process for vehicle operation may be performed through transmission or reception of signals or data between a boarding subject 510, a connection apparatus 520 for vehicle operation, a provider vehicle management system 530, a control server 540, or a vehicle management server 550.

The boarding subject 510 of FIG. 5 may correspond to a driver in the disclosure.

In FIG. 5, the provider vehicle management system 530 may include a vehicle service provider (e.g., a vehicle operating corporation) that operates DRT, an apparatus used by the vehicle service provider that operates DRT, or a digital interface provided for management of web pages and mobile applications used by the vehicle service provider that operates DRT.

In FIG. 5, the vehicle management server 550 may serve as a server that manages fleets including vehicles, and may manage pure data of a fleet, for example, a vehicle ID, a vehicle manufacturer, the number of passengers, and a vehicle type. In addition, the control server 540 of FIG. 5 may be a server that controls the operation of a fleet. The control server 540 may manage data, such as dispatch, service users (customers), and vehicle operation states. That is, the vehicle management server 550 may manage a mobility service, and the control server 540 may operate the mobility service.

In an embodiment, the vehicle management server 550 may be the same as the control server 540 or may be configured as a part of the control server 540.

The connection process for vehicle operation according to an embodiment may be performed after the boarding subject 510 connects the connection apparatus 520 for vehicle operation to a vehicle.

Referring to FIG. 5, in operation 5001, in response to the connection apparatus 520 for vehicle operation being connected to the vehicle, the connection apparatus 520 for vehicle operation may request the boarding subject 510 to input a first identifier input.

Referring to FIG. 5, in operation 5002, the boarding subject 510 may input a first identifier to the connection apparatus 520 for vehicle operation.

In the disclosure, the first identifier may correspond to vehicle service provider information. That is, the first identifier may be an identifier capable of identifying a company, corporation, or enterprise that provides or operates a vehicle service, such as a corporation ID or a provider registration number.

Referring to FIG. 5, in operation 5003, in response to the input of the first identifier from the boarding subject 510, the connection apparatus 520 for vehicle operation may request the vehicle management server 550 to verify the first identifier and register a preliminary connection apparatus.

Referring to FIG. 5, in operation 5004, the vehicle management server 550 may transmit, to the connection apparatus 520 for vehicle operation, a signal indicating completion of verification of the first identifier and registration of the preliminary connection apparatus.

Referring to FIG. 5, in operation 5005, in response to receiving the signal indicating completion of verification of the first identifier and registration of the preliminary connection apparatus, the connection apparatus 520 for vehicle operation may determine that the verification of the first identifier is completed and request the boarding subject 510 to input a second identifier.

Referring to FIG. 5, in operation 5006, the provider vehicle management system 530 may request a list of first identifier preliminary connection apparatuses from the control server 540. In operation 5007, in response to receiving the request of the list of first identifier preliminary connection apparatuses, the control server 540 may transmit the request of the list of first identifier preliminary connection apparatuses to the vehicle management server 550.

Referring to FIG. 5, in operation 5008, in response to the request of the list of first identifier preliminary connection apparatuses, the vehicle management server 550 may return the list of first identifier preliminary connection apparatuses to the control server 540. In operation 5009, in response to receiving the list of first identifier preliminary connection apparatuses, the control server 540 may transmit the list of first identifier preliminary connection apparatuses to the provider vehicle management system 530. In response to receiving the list of first identifier preliminary connection apparatuses, the provider vehicle management system 530 may match a connection apparatus to a pre-registered vehicle.

Referring to FIG. 5, in operation 5010, after the connection apparatus is matched to the pre-registered vehicle, the provider vehicle management system 530 may request registration of the connection apparatus to the pre-registered vehicle. The control server 540 may verify the pre-registered vehicle, in response to receiving the request of registration of the connection apparatus to the pre-registered vehicle.

Referring to FIG. 5, in operation 5011, after the pre-registered vehicle is verified, the control server 540 may request the vehicle management server 550 to register the connection apparatus to the pre-registered vehicle. The vehicle management server 550 may generate a second identifier, in response to receiving the request of registration of the connection apparatus to the pre-registered vehicle.

In the disclosure, the second identifier may correspond to equipment-specific information. Through verification of the second identifier, it may be determined whether an apparatus that is to access the DRT system and provide operation is a suitable apparatus, and it may be determined which function and interface to activate.

Also, in the disclosure, the second identifier may correspond to service-specific information. Driver software (e.g., an application) installed on a connection apparatus for vehicle operation may include various functions or services. The second identifier may be an identifier that is a basis for determining which service to provide among various types of services and determining a function corresponding to the service to be provided.

Referring to FIG. 5, in operation 5012, after the second identifier is generated, the vehicle management server 550 may return the second identifier to the control server 540. In operation 5013, in response to receiving the second identifier, the control server 540 may transmit the second identifier to the provider vehicle management system 530. In operation 5014, in response to receiving the second identifier, the provider vehicle management system 530 may transmit the second identifier to the boarding subject 510.

In an embodiment, operations 5006 to 5014 may be performed independently of or concurrently with operation 5005.

Referring to FIG. 5, in operation 5015, the request to input the second identifier may be received, and the boarding subject 510 that has received the second identifier may input the second identifier to the connection apparatus 520 for vehicle operation. For example, the boarding subject 510 may identify the second identifier received through a personal terminal and input the second identifier to the connection apparatus 520 for vehicle operation.

Referring to FIG. 5, in operation 5016, in response to receiving the second identifier, the connection apparatus 520 for vehicle operation may request the vehicle management server 550 to complete verification of the second identifier and registration of the vehicle. The vehicle management server 550 may register an equipment to the pre-registered vehicle, in response to receiving the request to complete verification of the second identifier and registration of the vehicle.

Referring to FIG. 5, in operation 5017, after the equipment is registered to the pre-registered vehicle, the vehicle management server 550 may transmit, to the connection apparatus 520 for vehicle operation, a signal indicating completion of verification of the second identifier and registration of a preliminary equipment. In an embodiment, the signal indicating completion of verification of the second identifier and registration of the preliminary equipment may include an access token for communication. The access token for communication may refer to an authority for the connection apparatus 520 for vehicle operation to access the DRT system to provide a service.

Referring to FIG. 5, in response to receiving the signal indicating completion of verification of the second identifier and registration of the preliminary equipment, the connection apparatus 520 for vehicle operation may activate interfaces corresponding to the first identifier and the second identifier. The connection apparatus 520 for vehicle operation may provide the activated interfaces to the boarding subject 510.

In an embodiment, when a verification failure signal for the first identifier is received, the connection apparatus 520 for vehicle operation may re-request the boarding subject 510 to input the first identifier.

In an embodiment, when a verification failure signal for the second identifier is received, the connection apparatus 520 for vehicle operation may re-request the boarding subject 510 to input the second identifier. In another embodiment, when a verification failure signal for the second identifier is received, the connection apparatus 520 for vehicle operation may re-request the boarding subject 510 to input the first identifier.

The driver software is installed on the connection apparatus 520 for vehicle operation. The driver software does not vary according to a driver, a vehicle service provider, or a service type and may be implemented for all drivers, vehicle service providers, and service types included in the DRT system. However, for efficient and effective demand-responsive vehicle operation, the driver software may provide functions or interfaces suitable for a driver, a vehicle service provider, and a service type. Accordingly, through a process of activating a corresponding interface, only appropriate functions or interfaces in software including various functions or interfaces may be activated and provided.

In an embodiment, an interface activated and provided by the connection apparatus 520 for vehicle operation may be an interface displayed in the before-starting-work state described above.

Figure 6A:
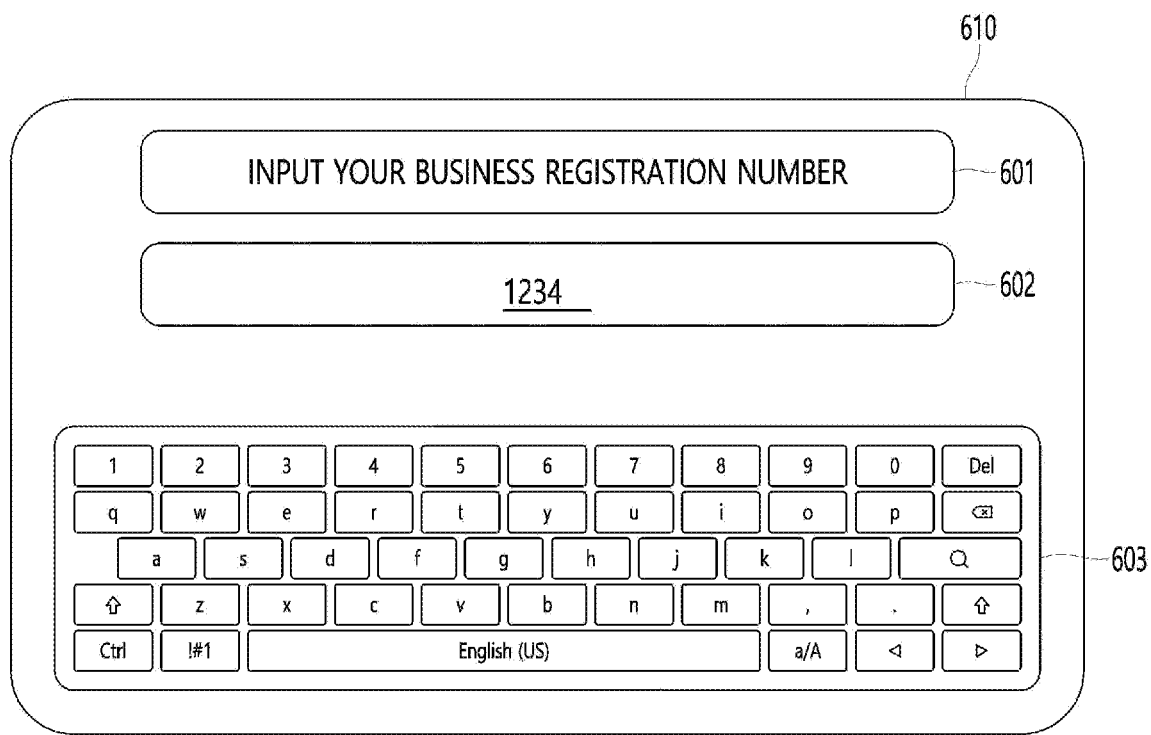
FIGS. 6A and 6B are diagrams of an interface that may be displayed in a connection process for vehicle operation, according to an embodiment.
Figure 6B:
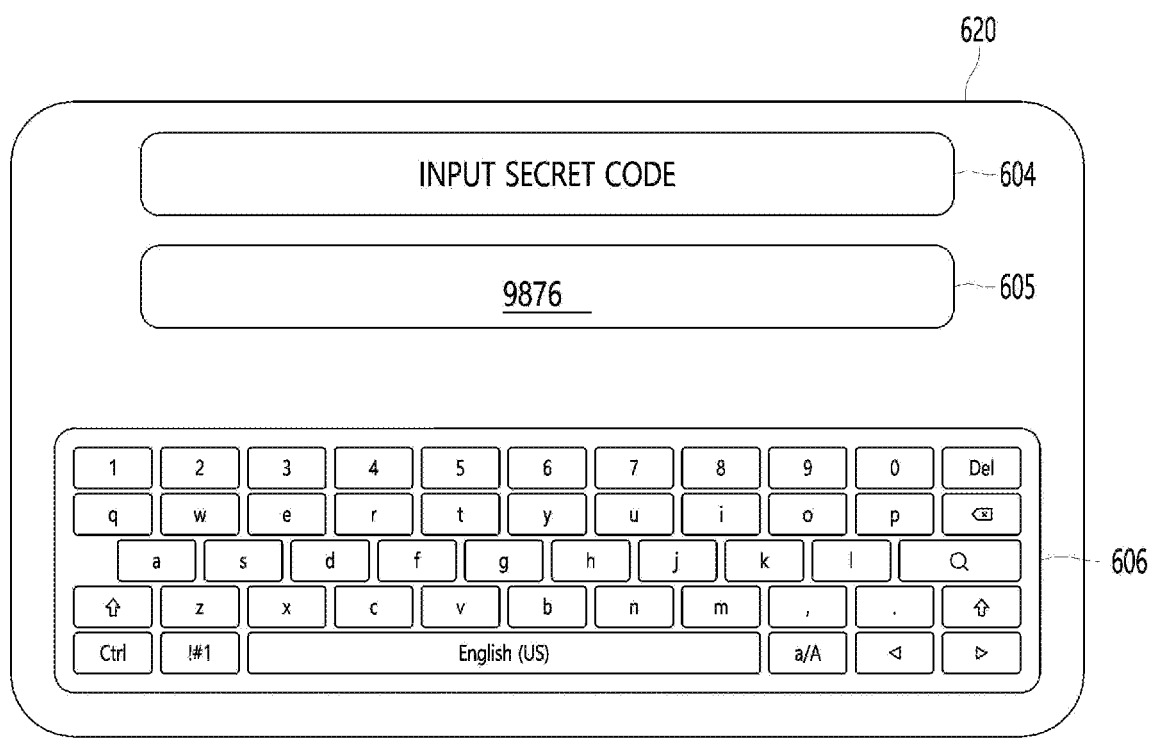

FIGS. 6A and 6B are diagrams of an interface that may be displayed in a connection process for vehicle operation, according to an embodiment.

As shown in FIGS. 6A and 6B, in the connection process for vehicle operation described above with reference to FIG. 5, an interface suitable for requesting an input from a driver and allowing the driver to input data may be provided by a connection apparatus for vehicle operation.

Referring to FIG. 6A, in an embodiment, in a process in which the connection apparatus for vehicle operation receives an input of a first identifier from the driver, a first identifier input interface 610 may be displayed. As shown in FIG. 6A, the first identifier input interface 610 may include a first message display area 601, a first input data display area 602, and a first data input interface 603.

In the disclosure, the first message display area 601 may refer to an area for displaying various types of messages including a message for notifying the driver what action he or she has to take. In particular, the first message display area 601 may be an area for displaying messages necessary for the driver in a process of inputting and verifying the first identifier.

In the disclosure, the first input data display area 602 may refer to an area configured for the driver to identify input data. In particular, the first input data display area 602 may be a means by which the driver who inputs the first identifier is able to identify, by himself or herself, whether he or she is correctly inputting the first identifier.

In the disclosure, the first data input interface 603 may refer to an interface including an object for the driver to input data. In an embodiment, the first data input interface 603 may be configured to include only necessary objects according to a composition method (e.g., Korean only, English only, English and numbers, etc.) of the first identifier.

In an embodiment, the connection apparatus for vehicle operation may configure the first message display area 601, the first input data display area 602, and the first data input interface 603, and may generate the first identifier input interface 610 including the first message display area 601, the first input data display area 602, and the first data input interface 603. In an embodiment, the connection apparatus for vehicle operation may display the generated first identifier input interface 610 to be provided to the driver.

FIG. 6A illustrates a process in which the driver inputs the first identifier through the first identifier input interface 610. As shown in FIG. 6A, interfaces suitable for various situations that may occur in a process of verifying the first identifier may be displayed.

In detail, in a process in which the connection apparatus for vehicle operation receives an input of the first identifier from the driver, the connection apparatus for vehicle operation may display a first identifier input waiting message in the first message display area 601. For example, the first identifier input waiting message may include a message waiting for completion of inputting the first identifier, such as "Please input your business registration number" or "Please input your corporation ID".

In response to the first identifier input waiting message, the driver may input the first identifier through an interaction with the first data input interface 603, and the connection apparatus for vehicle operation may display input data regarding the input first identifier in the first input data display area 602.

The first data input interface 603 may include an object for completing an input (e.g., an object in the shape of Enter key), and the driver may generate a first identifier input completion signal through an interaction with the object for completing the input.

In response to receiving the first identifier input completion signal, the connection apparatus for vehicle operation may transmit, to the control server, input data regarding the first identifier that has been input until the first identifier input completion signal is received. Also, the connection apparatus for vehicle operation may transmit driver information or vehicle information together with the input data regarding the first identifier, and based on this transmission, may request verification of the first identifier.

In an embodiment, a verification result is largely classified as a verification failure or verification success, and the connection apparatus for vehicle operation may generate the first identifier input interface 610 according to a signal according to the verification result.

For example, when the transmitted input data regarding the first identifier is not included in a list of data stored in the control server or the vehicle management server, that is, when the input data regarding the first identifier is not vehicle service provider information registered to the control server, the connection apparatus for vehicle operation may display an unregistered corporation message in the first message display area 601. For example, the unregistered corporation message may include a message indicating that the driver is not a driver of registered vehicle service provider, such as "This is an unregistered business operator" and "This is an unregistered corporation".

For example, when the connection apparatus for vehicle operation has been successfully verified by the control server, the connection apparatus for vehicle operation may display a first identifier verification completion message in the first message display area 601. For example, the first identifier verification completion message may include a message indicating that verification of the first identifier has been successfully completed, such as "Verification has been completed" and "Proceed to the next step".

Referring to FIG. 6B, in an embodiment, the connection apparatus for vehicle operation may display a second identifier input interface 620 in a process of receiving an input of a second identifier from the driver. As shown in FIG. 6B, the second identifier input interface 620 may include a second message display area 604, a second input data display area 605, and a second data input interface 606.

In the disclosure, similar to the first message display area 601, the second message display area 604 may refer to an area for displaying various types of messages including a message for notifying the driver what action he or she has to take. In particular, the second message display area 604 may be an area for displaying messages necessary for the driver in a process of inputting and verifying the second identifier.

In the disclosure, similar to the first input data display area 602, the second input data display area 605 may refer to an area configured for the driver to identify input data. In particular, the second input data display area 605 may be a means by which the driver who inputs the second identifier may identify, by himself or herself, whether he or she is correctly inputting the second identifier.

In the disclosure, similar to the first data input interface 603, the second data input interface 606 may refer to an interface including an object for the driver to input data. In an embodiment, the second data input interface 606 may be configured to include only necessary objects according to a composition method (e.g., Korean only, English only, English and numbers, etc.) of the second identifier.

In an embodiment, the connection apparatus for vehicle operation may configure the second message display area 604, the second input data display area 605, and the second data input interface 606, and may generate the second identifier input interface 620 including the second message display area 604, the second input data display area 605, and the second data input interface 606. In an embodiment, the connection apparatus for vehicle operation may display the generated second identifier input interface 620 to be provided to the driver.

FIG. 6B illustrates a process in which the driver inputs the second identifier through the second identifier input interface 620. As shown in FIG. 6B, interfaces suitable for various situations that may occur in a process of verifying the second identifier may be displayed.

In detail, in a process in which the connection apparatus for vehicle operation receives an input of the second identifier from the driver, the connection apparatus for vehicle operation may display a second identifier input waiting message in the second message display area 604. For example, the second identifier input waiting message may include messages waiting for completion of inputting the second identifier, such as "Please input a secret code" or "Please input an authentication number".

In response to the second identifier input waiting message, the driver may input the second identifier through an interaction with the second data input interface 606, and the connection apparatus for vehicle operation may display input data regarding the input second identifier in the second input data display area 605.

The second data input interface 606 may include an object for completing an input (e.g., an object in the shape of Enter key), and the driver may generate a second identifier input completion signal through an interaction with the object for completing the input.

In response to receiving the second identifier input completion signal, the connection apparatus for vehicle operation may transmit, to the control server, input data regarding the second identifier that has been input until the second identifier input completion signal is received. Based on this transmission, the connection apparatus for vehicle operation may request verification of the second identifier.

In an embodiment, a verification result may be largely classified as a verification failure or verification success. The connection apparatus for vehicle operation may generate the second identifier input interface 620 according to a signal according to the verification result.

For example, when the transmitted input data regarding the second identifier does not match the generated second identifier, the connection apparatus for vehicle operation may display a unique code mismatch message in the second message display area 604. For example, the unique code mismatch message may include a message indicating that the second identifier has been incorrectly input, such as "This is an incorrect secret code" or "This is an incorrect authentication number".

For example, when the transmitted input data regarding the second identifier matches a unique code, the connection apparatus for vehicle operation may display a second identifier verification completion message in the second message display area 604. For example, the second identifier verification completion message may include a message indicating that verification of the second identifier has been successfully completed, such as "Verification has been completed" and "Equipment access has been completed".

Hereinafter, a process of providing operation of the demand-responsive vehicle after connection for vehicle operation is completed will be described.

As described above, the demand-responsive vehicle may include the driver information providing apparatus, the passenger information providing apparatus, or the external display apparatus of a vehicle. The driver information providing apparatus may be the same as or correspond to the connection apparatus for vehicle operation described above.

In the disclosure, in a process of providing operation of the demand-responsive vehicle, the driver information providing apparatus may perform a process of determining a main interface for displaying information regarding a vehicle operation service and generating the determined main interface.

First, before the demand-responsive vehicle is assigned to operate, the main interface may be largely determined as a before-starting-work interface, a moving-to-workplace interface, or a standby-for-dispatch interface.

In an embodiment, the before-starting-work interface, the moving-to-workplace interface, and the standby-for-dispatch interface may include a driving route interface. The driving route interface may also be generated by the driver information providing apparatus, and the driver information providing apparatus may generate the driving route interface based on received or collected information.

Figure 7:
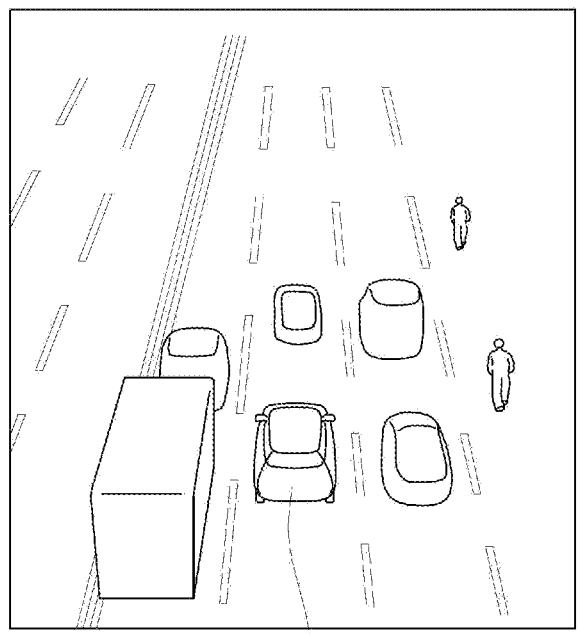
FIG. 7 is a diagram of a driving route interface according to an embodiment.

FIG. 7 is a diagram of a driving route interface according to an embodiment.

In the disclosure, a driving route interface 700 may refer to an interface displaying a surrounding environment of a vehicle in which a driver information providing apparatus is mounted (hereinafter, the term "own vehicle" refers to a vehicle in which the driver information providing apparatus is mounted, unlike other vehicles).

In an embodiment, the driving route interface 700 may include an icon corresponding to the own vehicle. The icon corresponding to the own vehicle may be based on vehicle information. For example, when the own vehicle is a car, the icon corresponding to the own vehicle may be a car-shaped icon, and when the own vehicle is a van, the icon corresponding to the own vehicle may be a van-shaped icon.

In an embodiment, the driving route interface 700 may include a lanes. In an embodiment, the lanes may be generated based on road information received based on location information about the own vehicle. In an embodiment, the lanes may be generated based on lane information around the own vehicle recognized by a sensor mounted in the own vehicle.

In an embodiment, the driving route interface 700 may include an icon corresponding to another vehicle around the own vehicle. In an embodiment, a shape of the icon corresponding to the other vehicle may be determined based on information about the other vehicle. In an embodiment, a location of the icon corresponding to the other vehicle may be determined based on location information about the other vehicle with respect to the own vehicle. In an embodiment, the information about the other vehicle or the location information about the other vehicle may be recognized from the sensor mounted in the own vehicle. The driver information providing apparatus may place the icon corresponding to the other vehicle at a location relative to the other vehicle with respect to the own vehicle.

In an embodiment, the driving route interface 700 may include an icon corresponding to a pedestrian around the own vehicle. In an embodiment, location information about the pedestrian may be recognized from the sensor mounted in the own vehicle. The driver information providing apparatus may place the icon corresponding to the pedestrian at a location relative to the other vehicle with respect to the own vehicle.

The driver information providing apparatus may generate the icon corresponding to the own vehicle, the lanes, the icon corresponding to the other vehicle, or the icon corresponding to the pedestrian, place the lanes, the icon corresponding to the other vehicle, or the icon corresponding to the pedestrian around the icon corresponding to the own vehicle based on received or collected information, and generate the driving route interface 700.

In an embodiment, the driving route interface 700 may be generated so that a vehicle that may affect driving is displayed differently from other vehicles. For example, an icon corresponding to a vehicle located in front of the own vehicle may be displayed in red. For example, when the own vehicle needs to change lanes to an outside lane to stop at a stop located on a road side, an icon corresponding to a vehicle adjacent to the right side of the own vehicle may be displayed in red.

In an embodiment, the driver information providing apparatus may set a threshold distance, generate icons in response to only other vehicles or pedestrians within a range of the threshold distance with respect to the own vehicle, and generate the driving route interface 700. For example, the driver information providing apparatus may generate the driving route interface 700 only with icons corresponding to other vehicles or pedestrians within a range of 10 m with respect to the own vehicle. For example, the threshold distance may be set by the control server or driver.

FIG. 7 illustrates the driving route interface 700 in which lanes around an own vehicle 710 and icons of a plurality of other vehicles and pedestrians are placed around an icon corresponding to the own vehicle 710.

As described above, the before-starting-work interface, the moving-to-workplace interface, and the standby-for-dispatch interface may include the driving route interface.

Figure 8:
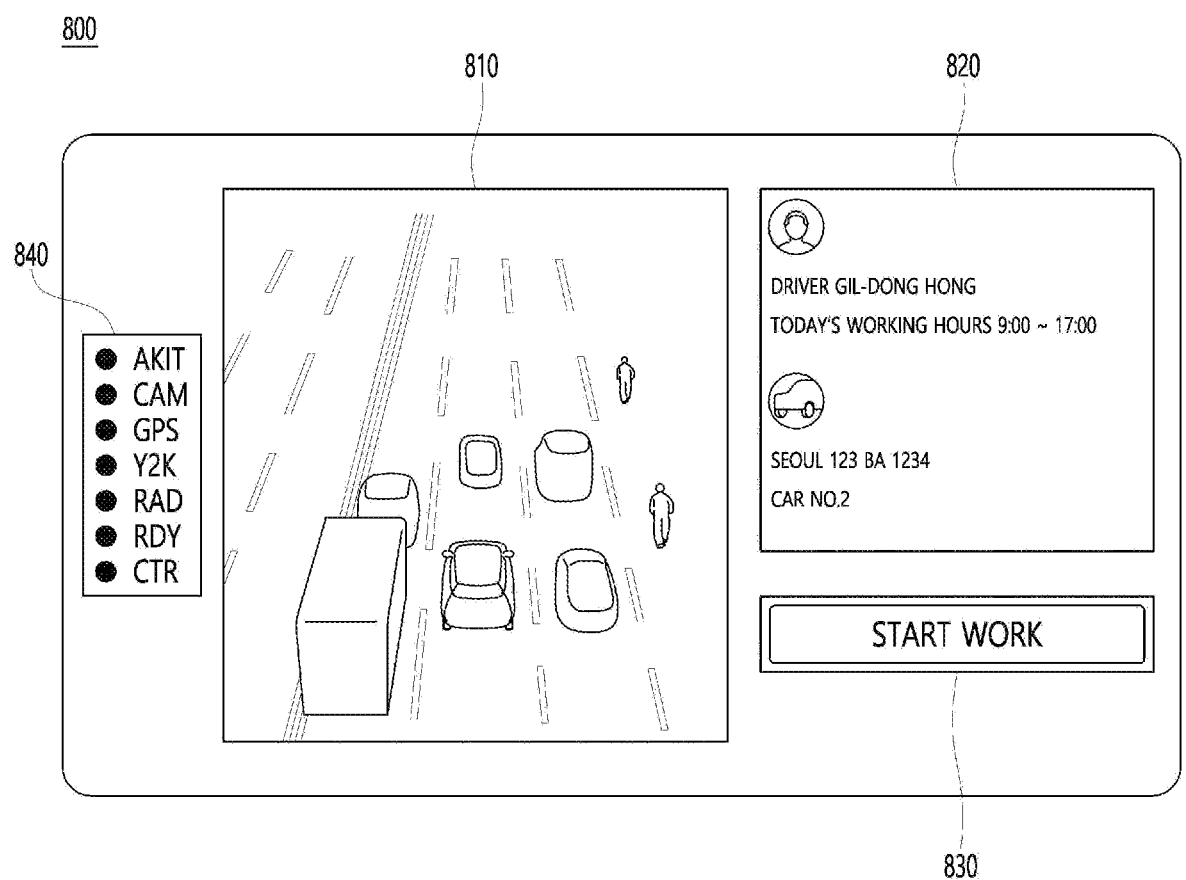
FIG. 8 is a diagram of a before-starting-work interface generated according to an embodiment.

FIG. 8 is a diagram of a before-starting-work interface generated according to an embodiment.

In the disclosure, in response to the vehicle being in a before-starting-work state, the driver information providing apparatus may determine a before-starting-work interface as a main interface. Alternatively, when the vehicle is in the before-starting-work state, the state is an initial stage after the connection process for vehicle operation is completed, and thus, as the initial stage, the driver information providing apparatus may determine the before-starting-work interface as the main interface. In response to determining the before-starting-work interface as the main interface, the driver information providing apparatus may generate the before-starting-work interface.

Referring to FIG. 8, a before-starting-work interface 800 generated according to an embodiment is shown.

In an embodiment, the before-starting-work interface 800 may include a driving route interface 810 described above, an interface 820 including driver information or vehicle information, an attendance authentication interface 830, or an autonomous driving function state interface 840.

In an embodiment, the interface 820 including the driver information or the vehicle information may be generated based on driver information and vehicle information included in the driver information providing apparatus.

In an embodiment, the attendance authentication interface 830 may include an object with which the driver may interact. When the driver interacts with the object included in the attendance authentication interface 830, an attendance authentication signal may be generated. In an embodiment, the generated attendance authentication signal may be transmitted to the control server.

In the disclosure, the autonomous driving function state interface 840 may refer to an interface displaying an operating state of at least one apparatus, function, etc. associated with autonomous driving mounted to implement autonomous driving of a vehicle. Referring to FIG. 8, the autonomous driving function state interface 840 may display whether the at least one apparatus, function, etc. associated with autonomous driving is normally operating through an indicator for each of the at least one apparatus, function, etc. associated with autonomous driving. This is provided as a simple example, and any suitable method capable of displaying an operating state of an apparatus, function, etc. may be applied.

In an embodiment, the before-starting-work interface 800 may further include an attendance authentication guidance message. For example, the attendance authentication guidance message may include a message suggesting that the driver perform attendance authentication, such as "Please press Start Work button".

In an embodiment, the vehicle state may be switched to a moving-to-workplace state in response to receiving the attendance authentication signal.

Figure 9:
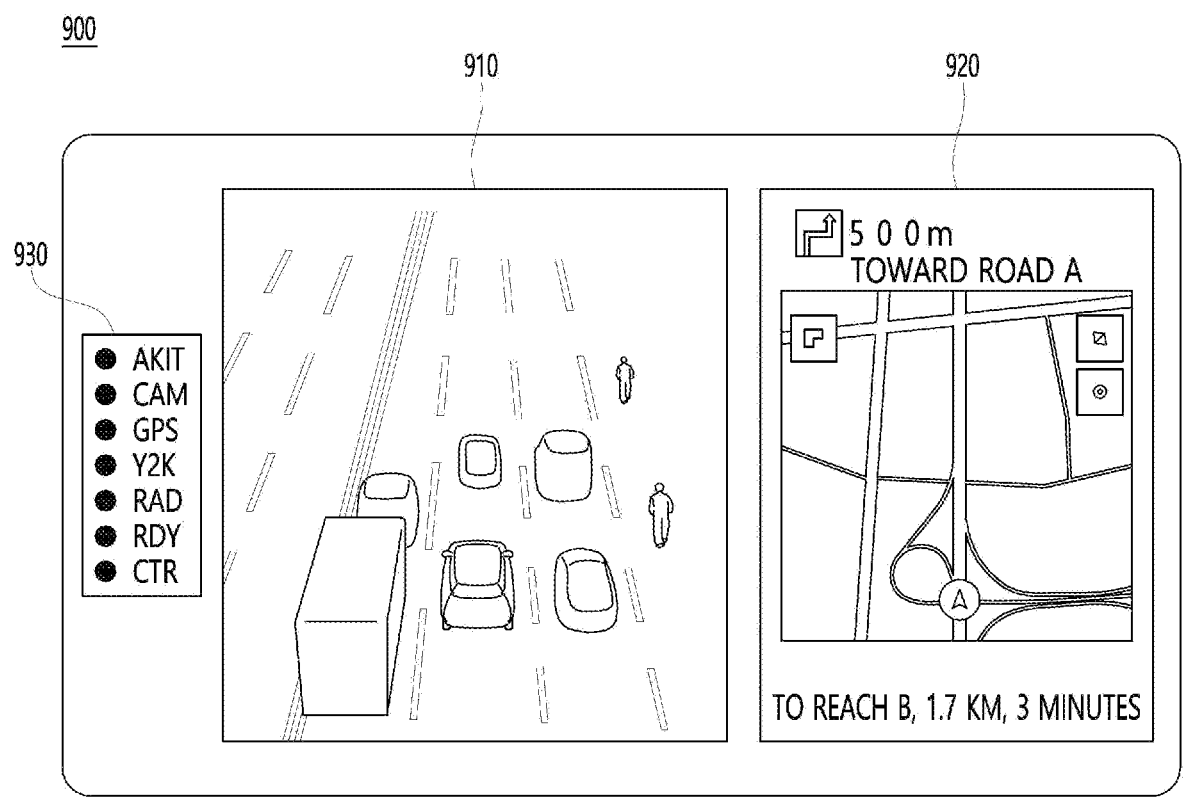
FIG. 9 is a diagram of a moving-to-workplace interface generated according to an embodiment.

FIG. 9 is a diagram of a moving-to-workplace interface generated according to an embodiment.

In the disclosure, in response to the vehicle state being switched to the moving-to-workplace state, the driver information providing apparatus may determine a moving-to-workplace interface as the main interface. In response to determining the moving-to-workplace interface as the main interface, the driver information providing apparatus may generate the moving-to-workplace interface.

Referring to FIG. 9, a moving-to-workplace interface 900 generated according to an embodiment is shown.

In an embodiment, the moving-to-workplace interface 900 may include a driving route interface 910 described above, a route guidance interface 920 configured to include destination information, navigation maps, and driving method guidance, or an autonomous driving function state interface 930.

In an embodiment, the route guidance interface 920 may be generated based on destination information, vehicle location information, road information based on vehicle location information, traffic information, or the like.

In an embodiment, a destination may be automatically set. For example, the driver information providing apparatus may set an arbitrary point in a workplace as a destination. For example, the driver information providing apparatus may set, as a destination, a point closest to a vehicle location among points on a predefined autonomous driving route. Accordingly, a driver who has completed attendance authentication may immediately drive a vehicle to the workplace or along the autonomous driving route.

In an embodiment, the destination information may include a name, an estimated time of arrival, or a remaining distance.

In an embodiment, the vehicle state may be switched to a standby-for-dispatch state in response to the vehicle location reaching the destination, that is, entering an autonomous driving route from a normal driving route.

In an embodiment, an operating mode of the vehicle may be switched to an autonomous driving mode in response to the vehicle location reaching the destination, that is, entering the autonomous driving route from the normal driving route.

Figure 10:
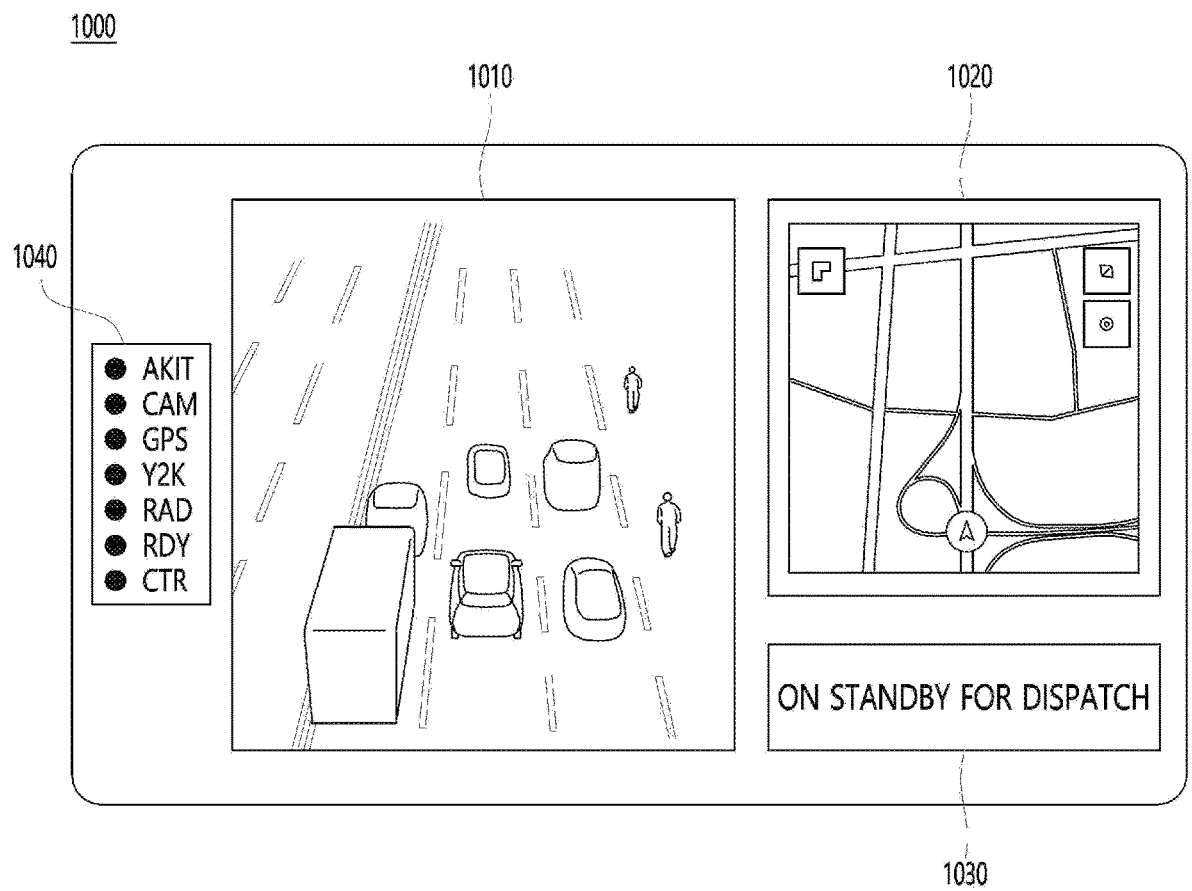
FIG. 10 is a diagram of a standby-for-dispatch interface generated according to an embodiment.

FIG. 10 is a diagram of a standby-for-dispatch interface generated according to an embodiment.

In the disclosure, in response to the vehicle state being switched to the standby-for-dispatch state, the driver information providing apparatus may determine a standby-for-dispatch interface as the main interface. In response to determining the standby-for-dispatch interface as the main interface, the driver information providing apparatus may generate the standby-for-dispatch interface.

Referring to FIG. 10, a standby-for-dispatch interface 1000 generated according to an embodiment is shown.

In an embodiment, the standby-for-dispatch interface 1000 may include a driving route interface 1010 described above, a route guidance interface 1020, a notification interface 1030, or an autonomous driving function state interface 1040.

In an embodiment, the route guidance interface 1020 may include a navigation map. In an embodiment, route guidance provided by the route guidance interface 1020 may be guidance on a predefined route. For example, the predefined route may be a workplace or an autonomous driving route. Also, the predefined route may be a circuit route whose departure point and destination are the same. In this case, when the vehicle is not assigned to operate, the vehicle may continue to operate on the circuit route.

In an embodiment, the notification interface 1030 may include various types of notifications related to vehicle operation assignment. For example, as shown in FIG. 10, the notification interface 1030 may include a message indicating that the vehicle is on standby for dispatch. For example, the notification interface 1030 may include information about the closest pick-up location on the circuit route. For example, the notification interface 1030 may include a message indicating that the vehicle is autonomously driving.

In an embodiment, a process in which the driver information providing apparatus determines the moving-to-workplace interface as the main interface and displays the same may also be omitted. For example, when the driver performs attendance authentication at the workplace or on the autonomous driving route, the vehicle state may skip the moving-to-workplace state and be switched to the standby-for-dispatch state. In this case, a process related to the moving-to-workplace interface may be omitted.

In an embodiment, the main interface to be displayed on the driver information providing apparatus may include a condition activation object. The condition activation object refers to an object that is activated only when a predefined condition is satisfied and with which the driver may interact. When the predefined condition is not satisfied, the condition activation object may be deactivated and displayed on the main interface.

The predefined condition may relate to a condition under which the vehicle is not endangered even when the driver interacts with an object included in the driver information providing apparatus. For example, the predefined condition may be a condition related to a vehicle speed. For example, the condition activation object may be activated only when a value of the current speed of the vehicle is 0. For example, the predefined condition may be a condition related to a vehicle state. For example, the condition activation object may be activated only when the vehicle state is a standby-for-dispatch state, a resting state, and a before-starting-work state.

In an embodiment, when the driver interacts with the condition activation object, the driver information providing apparatus may display a driver menu interface.

In an embodiment, the driver menu interface may include one or more objects with which the driver may interact, and the driver may receive, through an interaction with a corresponding object, driver information, vehicle information, an operation history, a work history of the driver, a work plan of a driver, a notice received from the control server (or vehicle management server), information such as settings of the driver information providing apparatus, terms and conditions, a driver manual, or the like. For example, the driver may identify the notice received from the control server through an interaction with an object corresponding to the notice.

The demand-responsive vehicle is in a state capable of being assigned to operate only when the vehicle is in the standby-for-dispatch state. A process of providing operation of the demand-responsive vehicle after being assigned to operate is described below with reference to FIGS. 11 and 12.

As described above, various states of the vehicle may include a state related to rest.

During the operation of the demand-responsive vehicle, when there is little time left until a scheduled rest time, the driver information providing apparatus may notify the driver that there is little time left until the scheduled rest time, and may guide matters related to rest.

In the disclosure, when the time left until the scheduled rest time reaches a first time, the driver information providing apparatus may display a rest guidance interface.

In an embodiment, the first time may be any suitable time, such as 5 minutes, 10 minutes, or 20 minutes. In an embodiment, the first time may be a time set by the driver, a corporation (vehicle service provider) to which the driver belongs, or the control server.

In an embodiment, the rest guidance interface is an interface that informs the driver that there is little time left until the scheduled rest time, and may include a message such as "Scheduled rest time starts in 10 minutes".

In the disclosure, when the vehicle is in the standby-for-dispatch state after the driver information providing apparatus displays the rest guidance interface, the vehicle state may be immediately switched to a moving-to-resting-area state. In contrast, when the vehicle is in an operating state, the vehicle state may be switched to the moving-to-resting-area state after an operation end signal is received. In an embodiment, when the time left until the scheduled rest time is less than or equal to the first time and the vehicle is in the operating state, the vehicle state may be switched to a state in which additional dispatch is not received.

In the disclosure, in response to the vehicle state being switched to the moving-to-resting-area state, the driver information providing apparatus may determine a moving-to-resting-area interface as the main interface. In response to determining the moving-to-resting-area interface as the main interface, the driver information providing apparatus may generate the moving-to-resting-area interface.

In the disclosure, the moving-to-resting-area interface may be similar to the moving-to-workplace interface 900 described above with reference to FIG. 9. That is, the moving-to-resting-area interface may include a driving route interface, and a route guidance interface configured to include destination information, navigation maps, and driving method guidance. However, in the embodiment of the moving-to-resting-area interface, a destination may be set to a resting area.

In an embodiment, when a vehicle location reaches the destination, that is, the resting area, the vehicle state may be switched to a resting state.

In the disclosure, when the vehicle is in the resting state and time left until a scheduled work time after resting reaches a second time, the driver information providing apparatus may display a rest end guidance interface.

In an embodiment, the second time may be any suitable time, such as 5 minutes, 10 minutes, or 20 minutes. In an embodiment, the second time may be a time set by the driver, the corporation (vehicle service provider) to which the driver belongs, or the control server.

In an embodiment, the rest end guidance interface is an interface that informs the driver that there is little time left until a rest end time, and may include a message such as "Rest will end in 10 minutes".

In the disclosure, when the time left until the scheduled work time after resting reaches 0, the vehicle state may be switched to the standby-for-dispatch state. Similarly, in response to the vehicle state being switched to the standby-for-dispatch state, the driver information providing apparatus may determine the standby-for-dispatch interface 1000 as the main interface.

In the disclosure, when time left until a work end time reaches a third time, the driver information providing apparatus may display a work end guidance interface.

In an embodiment, the third time may be any suitable time, such as 5 minutes, 10 minutes, or 20 minutes. In an embodiment, the third time may be a time set by the driver, the corporation (vehicle service provider) to which the driver belongs, or the control server.

In the disclosure, the work end guidance interface is an interface that informs the driver that there is little time left until a scheduled work end time, and may include a message such as "Work will end in 10 minutes".

In the disclosure, when the vehicle is in the standby-for-dispatch state after the driver information providing apparatus displays the work end guidance interface, the vehicle state may be immediately switched to a scheduled work end state. In contrast, when the vehicle is in the operating state, the vehicle state may be switched to the scheduled work end state after an operation end signal is received. In an embodiment, when the time left until the work end time is less than or equal to the third time and the vehicle is in the operating state, the vehicle state may be switched to the state in which additional dispatch is not received.

In the disclosure, the vehicle state may be switched to a moving-to-location-to-leave-work state in response to the time left until the work end time reaching 0.

In an embodiment, in response to the vehicle state being switched to the moving-to-location-to-leave-work state, the driver information providing apparatus may determine a moving-to-location-to-leave-work interface as the main interface. In response to determining the moving-to-location-to-leave-work interface as the main interface, the driver information providing apparatus may generate the moving-to-location-to-leave-work interface.

In the disclosure, the moving-to-location-to-leave-work interface may be similar to the moving-to-workplace interface 900 described above with reference to FIG. 9. That is, the moving-to-location-to-leave-work interface may include a driving route interface, and a route guidance interface configured to include destination information, navigation maps, and driving method guidance. However, in the embodiment of the moving-to-location-to-leave-work interface, a destination may be set to a location to leave work.

In an embodiment, when a vehicle location reaches the destination, that is, the location to leave work, the vehicle state may be switched to a work end state.

Hereinafter, a process of providing operation of the demand-responsive vehicle in relation to passengers getting on and off after the vehicle is assigned to operate is described.

In the disclosure, when the vehicle is in the standby-for-dispatch state, the vehicle may be assigned to operate. That is, when the vehicle is in the standby-for-dispatch state, a dispatch request signal may be received.

In an embodiment, the vehicle state may be switched to a moving-to-pick-up-location state in response to receiving the dispatch request signal.

Figure 11:
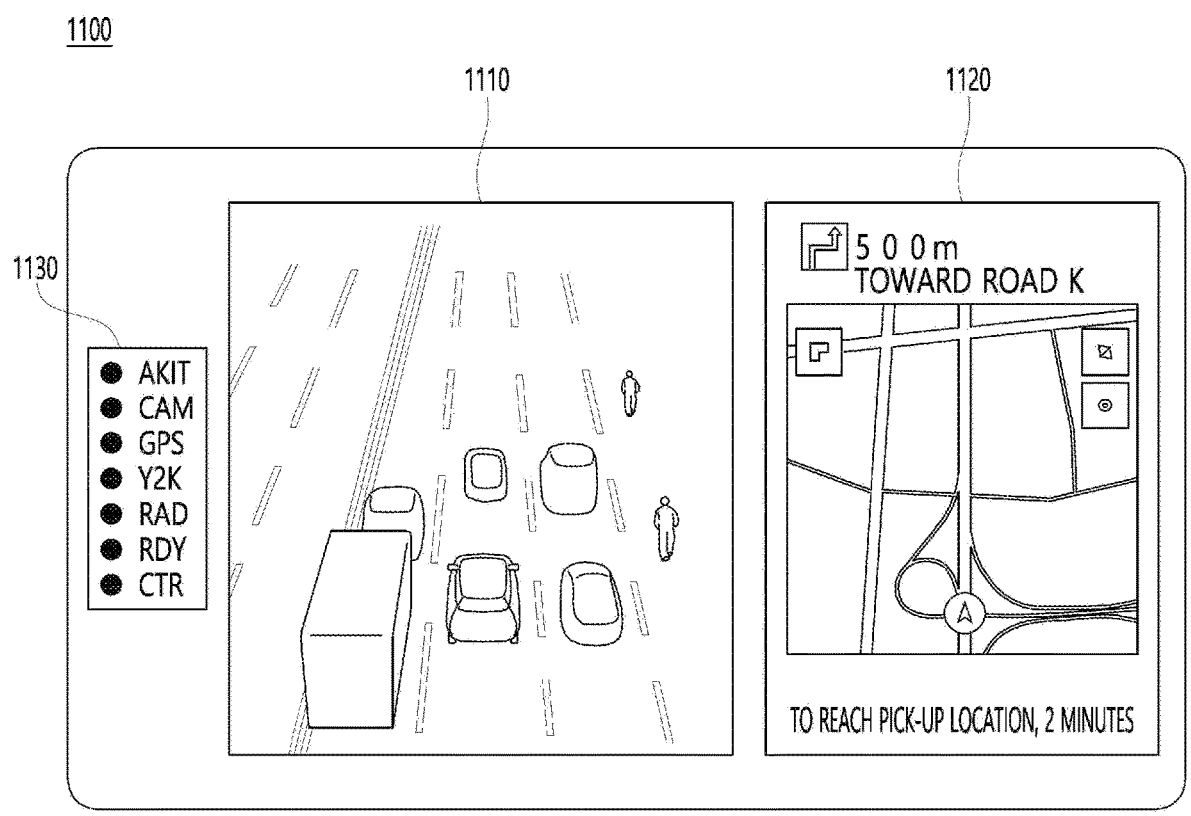
FIG. 11 is a diagram of a moving-to-pick-up-location interface generated according to an embodiment.

FIG. 11 is a diagram of a moving-to-pick-up-location interface generated according to an embodiment.

In the disclosure, in response to the vehicle state being switched to the moving-to-pick-up-location state, the driver information providing apparatus may determine a moving-to-pick-up-location interface as the main interface. In response to determining the moving-to-pick-up-location interface as the main interface, the driver information providing apparatus may generate the moving-to-pick-up-location interface.

Referring to FIG. 11, a moving-to-pick-up-location interface 1100 generated according to an embodiment is shown.

In an embodiment, the moving-to-pick-up-location interface 1100 may include a driving route interface 1110 described above, a route guidance interface 1120 configured to include destination information, navigation maps, and driving method guidance, or an autonomous driving function state interface 1130.

In an embodiment, the destination is a pick-up location and may be automatically set based on information included in a dispatch request signal.

In an embodiment, the destination information may include a name, an estimated time of arrival, or a remaining distance.

In an embodiment, even when the vehicle is not in the standby-for-dispatch state, the dispatch request signal may be received. For example, when the vehicle may only drive a preset route and a new destination included in a new dispatch request signal is on the preset route, the new dispatch request signal may be received. In the present embodiment, when the new destination included in the new dispatch request signal is reached earlier than an existing destination on the preset route, this situation may be referred to as a stopover addition situation. In contrast, when the new destination included in the new dispatch request signal is reached later than the existing destination on the preset route, this situation may be referred to as a dispatch addition situation. In both cases, when the new destination is added by the new dispatch request signal, each destination may be referred to as a stopover destination.

In an embodiment, when the new dispatch request signal is received, the destination information may be updated based on existing destination information and new destination information included in the new dispatch request signal. In an embodiment, in response to the destination information being updated, the driver information providing apparatus may display an update notification message.

In an embodiment, when the destination includes a plurality of stopover destinations, for the destination information included in the route guidance interface 1120, information regarding a stopover destination that is reached first and information regarding a stopover destination that is reached next, among the plurality of stopover destinations, may be switched and displayed according to a certain period. For example, the driver information providing apparatus may display the stopover destination that is reached first for 4 seconds and then display the stopover destination that is reached next for 2 seconds.

When the vehicle is in the moving-to-pick-up-location state and when the vehicle arrives at the pick-up location and the passenger boards the vehicle, the vehicle state may be switched to a moving-to-drop-off-location state. In a process in which the vehicle state is switched from the moving-to-pick-up-location state to the moving-to-drop-off-location state, various embodiments may be made.

In an embodiment, when a distance between the vehicle to the destination (pick-up location) is less than or equal to a first threshold distance, the driver information providing apparatus may display an arrival notification message. In an embodiment, the driver information providing apparatus may display a pick-up location arrival completion object, in response to the distance between the vehicle and the destination (pick-up location) being less than or equal to the first threshold distance. The pick-up location arrival completion object may refer to an object with which the driver interacts to generate a pick-up location arrival completion signal. The first threshold distance may be arbitrarily set to a value suitable for notifying that the destination is almost reached, such as 50 m, 100 m, or 150 m.

In an embodiment, in response to interacting with the pick-up location arrival completion object, the driver information providing apparatus may display a boarding completion object. The boarding completion object may refer to an object with which the driver interacts to generate a boarding completion signal. In an embodiment, the boarding completion signal may be generated in response to interacting with the boarding completion object, and the vehicle state may be switched to the moving-to-drop-off-location state in response to receiving the boarding completion signal.

In an embodiment, in response to interacting with the pick-up location arrival completion object, the driver information providing apparatus may display a timer. The timer may count down a certain amount of time. In the disclosure, a smooth DRT system may be provided by canceling dispatch when the certain amount of time has elapsed without the passenger boarding the vehicle, rather than standing by at the pick-up location until the passenger boards the vehicle. That is, when the boarding completion signal is not received until the certain amount of time elapses, the vehicle state may be switched to the standby-for-dispatch state. The certain amount of time may be arbitrarily set to a value suitable for providing a smooth DRT system, such as 3 minutes or 5 minutes.

In the disclosure, in response to the vehicle state being switched to the moving-to-drop-off-location state, the driver information providing apparatus may determine a moving-to-drop-off-location interface as the main interface. In response to determining the moving-to-drop-off-location interface as the main interface, the driver information providing apparatus may generate the moving-to-drop-off-location interface.

In the disclosure, the moving-to-drop-off-location interface may be similar to the moving-to-pick-up-location interface 1100 described above with reference to FIG. 11. That is, the moving-to-drop-off-location interface may include a driving route interface, or a route guidance interface 1120 configured to include destination information, navigation maps, and driving method guidance. In this case, the destination is a drop-off location and may be automatically set based on information included in a dispatch request signal. In addition, the embodiments related to the moving-to-pick-up-location interface described above may equally apply to the moving-to-drop-off-location interface.

When the vehicle is in the moving-to-drop-off-location state and when the vehicle arrives at the drop-off location and the passenger gets off the vehicle, the vehicle state may be switched to the standby-for-dispatch state. In a process in which the vehicle state is switched from the moving-to-drop-off-location state to the standby-for-dispatch state, various embodiments may be made.

In an embodiment, when a distance between the vehicle to the destination (drop-off location) is less than or equal to a second threshold distance, the driver information providing apparatus may display an arrival notification message. In an embodiment, the driver information providing apparatus may display a drop-off location arrival completion object, in response to the distance between the vehicle and the destination (drop-off location) being less than or equal to the second threshold distance. The drop-off location arrival completion object may refer to an object with which the driver interacts to generate a drop-off location arrival completion signal. The second threshold distance may be arbitrarily set to a value suitable for notifying that the destination is almost reached, such as 50 m, 100 m, or 150 m. The second threshold distance may be the same as or different from the first threshold distance.

In an embodiment, in response to interacting with the drop-off location arrival completion object, the driver information providing apparatus may display a getting-off completion object. The getting-off completion object may refer to an object with which the driver interacts to generate a getting-off completion signal. In an embodiment, the getting-off completion signal may be generated in response to interacting with the getting-off completion object, and the vehicle state may be switched to the standby-for-dispatch state in response to receiving the getting-off completion signal.

In an embodiment, a plurality of operating modes may be provided. The plurality of operating modes may include an autonomous driving mode and a manual driving mode. In an embodiment, the vehicle may be switched to the autonomous driving mode by manipulation of the driver. In an embodiment, the vehicle may be switched to the autonomous driving mode on an autonomous driving route, which is a route on which autonomous driving may be performed.

In an embodiment, when the vehicle enters a compulsory manual driving zone in which the vehicle is unable to operate in a demand-responsive autonomous driving mode, the driver information providing apparatus may display a manual driving mode switching request message. The manual driving mode switching request message may include a message requesting the driver to switch to a manual driving mode, such as "Please switch to the manual driving mode".

In an embodiment, the compulsory manual driving zone may include a children protection zone.

In an embodiment, when a vehicle is in the compulsory manual driving zone, the vehicle is unable to be switched to the autonomous driving mode by the driver.

In an embodiment, when an operating mode of the vehicle is switched, the driver information providing apparatus may display an operating mode switching message. The operating mode switching message may include a message indicating that the operating mode has been switched, such as "Vehicle has been switched to a manual driving mode" or "Vehicle has been switched to an autonomous driving mode".

Figure 12:
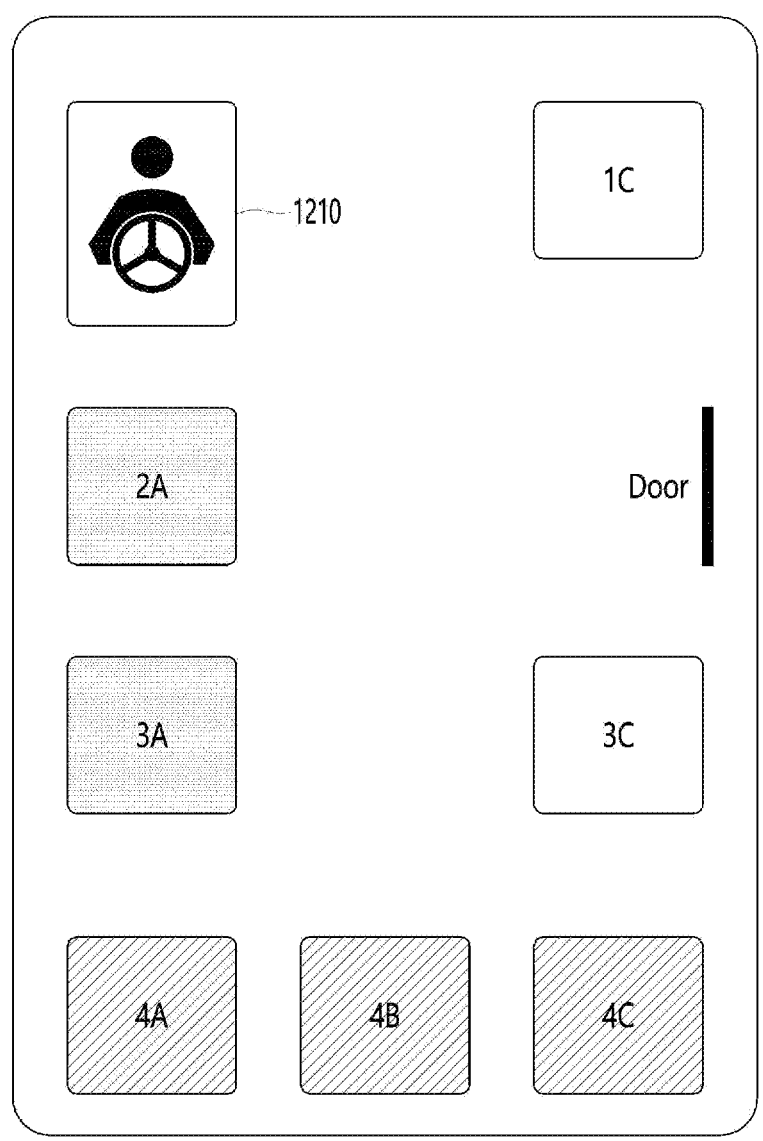
FIG. 12 is a diagram of a seat information interface generated according to an embodiment.

FIG. 12 is a diagram of a seat information interface generated according to an embodiment.

In an embodiment, the moving-to-pick-up-location interface may further include a seat information interface 1200. For example, when a vehicle is a van, seats for passengers to sit in the vehicle may also be assigned to the passengers, and the seat information interface 1200 may be an interface for displaying information regarding the assigned seats accordingly.

Referring to FIG. 12, the seat information interface 1200 including objects corresponding to a plurality of seats 1C, 2A, 3A, 3C, 4A, 4B, and 4C including a driver seat 1210 is shown.

In an embodiment, the seat information interface 1200 may be generated based on vehicle seat information. The vehicle seat information may be information transmitted from the control server or stored in the driver information providing apparatus. The driver information providing apparatus may generate a seat layout displaying an arrangement of a plurality of seats based on the vehicle seat information.

In an embodiment, each of the plurality of seats may be differently displayed according to a seat state of each of the plurality of seats in the generated seat layout. In an embodiment, the seat state may be, for example, any one of a boarding-completed state, a boarding-scheduled state, and a remaining state. The boarding-completed state may refer to a state in which a passenger has boarded at a pick-up location and is sitting in a corresponding seat, the boarding-scheduled state may refer to a state in which a passenger who is scheduled to board has not yet boarded at the pick-up location, but is scheduled to sit in a corresponding seat, and the remaining state may refer to a state in which a seat has not been assigned, and thus, there is no passenger scheduled to sit in the corresponding seat.

Referring to FIG. 12, objects corresponding to the seats 2A and 3A in the seat layout are colored dark, which may indicate the boarding-completed state. Referring to FIG. 12, objects corresponding to the seats 4A, 4B, and 4C in the seat layout are striped, which may indicate the boarding-scheduled state. Referring to FIG. 12, objects corresponding to the seats 1C and 3C are not processed in any manner, which may indicate the remaining state. This is provided as a simple example, and any suitable method of indicating the seat state may be applied.

In an embodiment, the seat information interface 1200 generated by the driver information providing apparatus may be based on seat information data. The seat information data may be transmitted from the control server, and the seat information data transmitted by the control server may be generated upon a request from a user terminal used by a service user. That is, the seat information interface 1200 may be generated in conjunction with the control server or the user terminal.

In an embodiment, in a dispatch process for a user, when there are a plurality of passengers, an assigned vehicle as well as seats for the passengers to sit may be determined. Information about a determined pick-up location of a passenger and a seat scheduled to be taken by the passenger may be transmitted to the demand-responsive vehicle, and the driver information providing apparatus may determine, based on the transmitted information, the state of the seat scheduled to be taken as the boarding-scheduled state until the vehicle reaches the pick-up location, and generate the seat information interface 1200.

In an embodiment, various methods may be applied to assign seats to passengers. For example, when one user terminal requests boarding for a plurality of people, adjacent seats may be assigned to the plurality of people. For example, when one user terminal requests boarding for one person, a seat that has no adjacent seats to the left and right may be preferentially assigned. For example, a seat with the smallest number of adjacent seats in the boarding-completed state or a seat with the smallest number of adjacent seats in the boarding-scheduled state may be preferentially assigned. In addition, any suitable method of assigning the seats may be applied.

In addition, the seat information data may be modified by the driver information providing apparatus, and the modified seat information data may be transmitted to the control server. In an embodiment, the driver may modify or transmit the seat information data through an interaction with the seat information interface displayed on the driver information providing apparatus.

For example, the vehicle may leave a specific pick-up location without a passenger who has agreed to board at the pick-up location. In this case, when the vehicle leaves the pick-up location, a seat in the boarding-scheduled state needs to be changed to a remaining seat, rather than being switched to the boarding-completed state.

Accordingly, in an embodiment, an object corresponding to each of the plurality of seats displayed in the seat layout may be generated so that the driver may interact therewith. In an embodiment, when the driver interacts with an object corresponding to a seat in the boarding-scheduled state or a seat in the boarding-completed state, a seat state of the corresponding seat may be changed to a remaining seat. When the seat state of the corresponding seat is changed to a remaining seat, the driver information providing apparatus may change an object corresponding to the corresponding seat in the seat layout to a remaining seat and display the changed object. The driver information providing apparatus may modify or transmit the seat information data based on the changed seat state. Accordingly, the driver may forcibly change the seat state to a remaining seat state.

In an embodiment, the main interface that may be generated by the driver information providing apparatus may further include an operation control interface. The operation control interface may refer to an interface through which the driver interacts to manually or forcibly cancel vehicle assignment or stop vehicle assignment. In an embodiment, the operation control interface may include an operation cancellation object or a dispatch stop object. The operation cancellation object may be an object with which the driver interacts to cancel vehicle assignment, and the dispatch stop object may be an object with which the driver interacts to stop vehicle assignment. In an embodiment, the operation cancellation object may be activated only in the moving-to-pick-up-location state.

In an embodiment, when the driver interacts with the operation cancellation object or the dispatch stop object, the driver information providing apparatus may generate a reason input interface through which a reason may be input. In an embodiment, the reason input interface may be generated to select one of a plurality of preset reasons. For example, the plurality of preset reasons may include a driver reason, a passenger reason, and occurrence of an accident.

In an embodiment, when a reason input by the driver through the reason input interface corresponds to "occurrence of an accident", the vehicle state may be switched to an accident occurrence state. In the disclosure, the accident occurrence state may refer to a state in which operation is stopped and vehicle assignment is stopped until the accident is handled.

In an embodiment, in response to the vehicle state being switched to the accident occurrence state, the driver information providing apparatus may generate an accident occurrence interface. The accident occurrence interface may include an object with which the driver may interact to generate an accident handling completion signal. The vehicle state may be switched to the standby-for-dispatch state in response to receiving the accident handling completion signal.

In addition to the aforementioned interface, an interface that may be generated for display by the driver information providing apparatus may include any suitable interface necessary for vehicle operation. For example, an interface indicating a driving state of the vehicle may be included. For example, an interface indicating whether sensors or functions of the vehicle are operating may be included.

In the disclosure, the passenger information providing apparatus may generate an interface (hereinafter, referred to as a "passenger interface") to be displayed on the passenger information providing apparatus. The passenger interface may be configured to display necessary information to a passenger who has boarded the demand-responsive vehicle.

In an embodiment, the passenger interface may be configured to include a part or all of the interface displayed on the driver information providing apparatus.

In an embodiment, the passenger interface may include a driving route interface. In an embodiment, the driving route interface included in the passenger interface may be obtained by omitting some pieces of information (e.g., an icon corresponding to a pedestrian) from the driving route interface included in the interfaces displayed on the driver information providing apparatus.

In an embodiment, the passenger interface may include a route guidance interface. In an embodiment, the route guidance interface included in the passenger interface may be obtained by omitting some pieces of information (e.g., a driving method guidance) from the route guidance interface included in the interfaces displayed on the driver information providing apparatus.

In an embodiment, the passenger interface may include a seat information interface. In an embodiment, the seat information interface included in the passenger interface may be obtained by adding some pieces of information (e.g., a current seat location) to the seat information interface included in the interfaces displayed on the driver information providing apparatus.

In an embodiment, the passenger interface may include a stop information interface. The stop information interface may be configured to display information regarding a stop where the demand-responsive vehicle stops for a passenger to get on or off. The stop information interface may include information regarding a first stop to reach and may further include information about a next stop to reach. In an embodiment, the information regarding the first stop to reach and the information regarding the next stop to reach may be alternately displayed at a predefined period.

In an embodiment, the passenger interface may include a guide message interface. A guide message that may be included in the guide message interface may include, for example, a message to fasten a seat belt, a message to prepare to get off, etc. In an embodiment, in response to the operating mode of the vehicle being switched from the autonomous driving mode to the manual driving mode, the guide message may include a message indicating that the operating mode has been switched.

In addition to the aforementioned interface, a passenger interface that may be generated for display by the passenger information providing apparatus may include any suitable interface necessary to provide information to a passenger.

Hereinafter, an operation of an external display apparatus in a process of providing operation of the demand-responsive vehicle will be described.

FIG. 13(a) to FIG. 13(e) are diagrams for describing operations of an external display apparatus, according to embodiments.

In an embodiment, the external display apparatus may collect data including vehicle information, vehicle state, vehicle location information, destination information, or a signal generated by an apparatus mounted in a vehicle.

In an embodiment, the external display apparatus may generate an external display interface based on the collected data and may be linked with the driver information providing apparatus or the passenger information providing apparatus. In particular, the external display interface may be generated based on the aforementioned interfaces included in various interfaces generated by the driver information providing apparatus. In an embodiment, the external display apparatus and the driver information providing apparatus may include a common processor, that is, may be substantially the same apparatus.

In an embodiment, the external display apparatus may include a plurality of external displays. For example, the external display apparatus may include a front display and a rear display. The front display may be a display installed on the front of the vehicle, and the rear display may be a display installed on the rear of the vehicle.

Figure 13A:
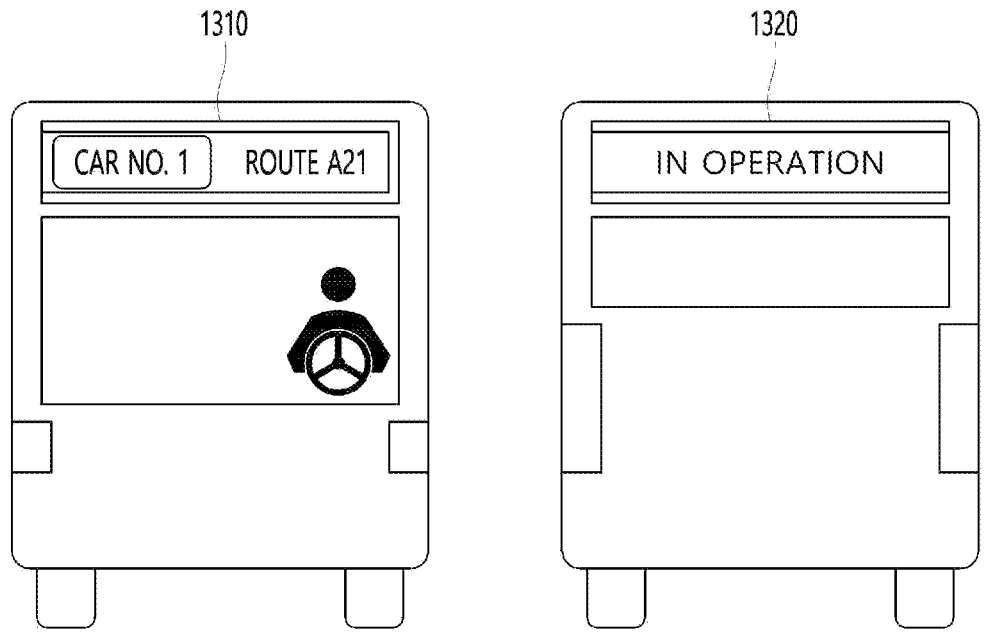
FIG. 13(a) to FIG. 13(e) are diagrams for describing operations of an external display apparatus, according to embodiments.

Referring to FIG. 13(a), a front display 1310 and a rear display 1320 are shown. As shown in FIG. 13(a), the front display 1310 may be installed on the front of the vehicle, and the rear display 1320 may be installed on the rear of the vehicle. In FIG. 13(a), external display interfaces displayed on the front display 1310 and the rear display 1320 are different but may be identically generated. That is, the external display apparatus may generate a front external display interface and a rear external display interface.

Figure 13B:
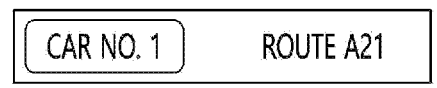

In an embodiment, the external display apparatus may differently generate the front external display interface and the rear external display interface based on the collected data. For example, a subject mainly viewing a front external display and a subject mainly viewing a rear external display may be different, and accordingly, content suitable for display on each external display may also be different. For example, when the vehicle is in a moving-to-pick-up-location state or a moving-to-drop-off-location state, as shown in FIG. 13(a), the front display 1310 may display a vehicle name and a circuit route name, and the rear display 1320 may display only a message indicating that the vehicle is in operation. For example, when the vehicle enters a children protection zone, the front display 1310 may display the vehicle name and the circuit route name as shown in FIG. 13(b), and the rear display 1320 may display only a message indicating that the vehicle is located in the children protection zone as shown in FIG. 13(d). For example, when the vehicle has stopped at a pick-up location (or drop-off location) for a passenger to get on (or off) (e.g., after the driver interacts with a pick-up location arrival completion object and before the driver inputs a boarding completion signal), the front display 1310 may display the vehicle name and the circuit route name as shown in FIG. 13(b), and the rear display 1320 may display only a message indicating that a passenger is getting on or off as shown in FIG. 13(e).

In an embodiment, a front display interface and a rear display interface for various situations may be shown as in Table 1 below, but are not limited thereto.

TABLE 1

| Situations | Front display | Rear display |
| --- | --- | --- |
| Before starting work | Preparing for operation | Preparing for operation |
| Standby for dispatch | Car No. 1/Route A 21 | In operation |
| Dispatch stopped | Preparing for operation | Preparing for operation |
| Dispatch completed (moving to pick-up location) | Car No. 1/Route A 21 | In operation |
| Arrived at pick-up location (drop-off location) | Car No. 1/Route A 21 | Passenger is getting on or off |
| Children protection zone | Car No. 1/Route A 21 | Located in children protection zone |
| Accident occurred | Vehicle inspection is in progress | Vehicle inspection is in progress |
| Moving to resting area | Car No. 1 Heading to standby area | Heading to standby area Car No. 1 |
| Moving to location to leave work | Car No. 1 Heading to garage | Heading to garage Car No. 1 |
| Work ended | Preparing for operation | Preparing for operation |

In an embodiment, the external display interface may be generated based on the vehicle information. For example, the external display interface may be generated to display a vehicle name. The vehicle name may refer to a name that allows a passenger to identify which vehicle is among a plurality of vehicles in the DRT system. For example, when the vehicle is a vehicle that operates along a circuit route, the external display interface may be generated to display a circuit route name. Referring to FIG. 13(b), the external display interface may display the vehicle name and the circuit route name.

In an embodiment, the external display interface may be generated based on the vehicle state. For example, when the vehicle is in a not-in-operation state, that is, in one of a before-starting-work state, a moving-to-workplace state, a moving-to-resting-area state, a resting state, a scheduled work end state, a moving-to-location-to-leave-work state, and a work end state, the external display interface may be generated to display a message indicating that the vehicle is not in operation. As an example, the message indicating that the vehicle is not in operation may include a message such as "Preparing for operation".

As another example, when the vehicle is in the moving-to-resting-area state, the message may include a message such as "Heading to a standby area". As another example, when the vehicle is in the moving-to-location-to-leave-work state, the message may include a message such as "Heading to a garage".

Figure 13C:
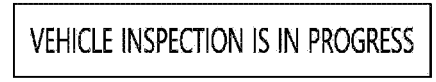
Figure 13D:
Figure 13E:

For example, when the vehicle is in an accident occurrence state, the external display interface may include a vehicle inspection message such as "Vehicle inspection is in progress", as shown in FIG. 13(c).

In an embodiment, the external display interface may be generated based on the vehicle location information. For example, the external display apparatus may receive a vehicle location, and in response to the received vehicle location entering a specific area, the external display interface may be generated to include a specific message. As an example, the specific message may be a message notifying that the vehicle has entered a specific area. As a specific example, the specific area may be a special driving road, such as a children protection zone or a road for the exclusive use of motor vehicles, rather than a general driving road. For example, when the vehicle has entered the children protection zone, a message notifying that the vehicle has entered the children protection zone may be displayed, as shown in FIG. 13(d). As another specific example, when the vehicle has entered a compulsory manual driving zone in which the vehicle is unable to operate in an autonomous driving mode and the operating mode of the vehicle is switched to a manual driving mode, the external display interface may be generated to display a manual driving mode switching notification message. For example, the manual driving mode switching notification message may include a message indicating that the operating mode has been switched, such as "Vehicle is driving in a manual driving mode". For example, the compulsory manual driving zone may include the children protection zone.

In the present embodiment, the vehicle location information may be received by the external display apparatus independently of other apparatuses such as the driver information providing apparatus, and accordingly, the external display apparatus may generate an interface based on the location information independently of the driver information providing apparatus.

In an embodiment, the external display interface may be generated based on the destination information. For example, the external display interface may periodically display a destination name according to a certain period.

In an embodiment, the external display interface may be generated based on the signal generated by the apparatus mounted in the vehicle. For example, in response to interacting with a pick-up location arrival completion object, the external display interface may be generated to include a message indicating that a passenger is boarding. The message indicating that the passenger is boarding may remain until a boarding completion signal is received. For example, in response to interacting with a drop-off location arrival completion object, the external display interface may be generated to include a message indicating that a passenger is getting off. The message indicating that the passenger is getting off may remain until a getting-off completion signal is received. For example, as shown in FIG. 13(e), a message indicating that a passenger is getting on or off may include a message such as "Passenger is getting on or off".

In an embodiment, the external display interface may be generated based on a function operated in the vehicle. For example, when the vehicle makes a right turn, in response to a right turn signal being turned on, the external display interface may be generated to display a message or an object indicating that the vehicle will make a right turn.

Figure 14:
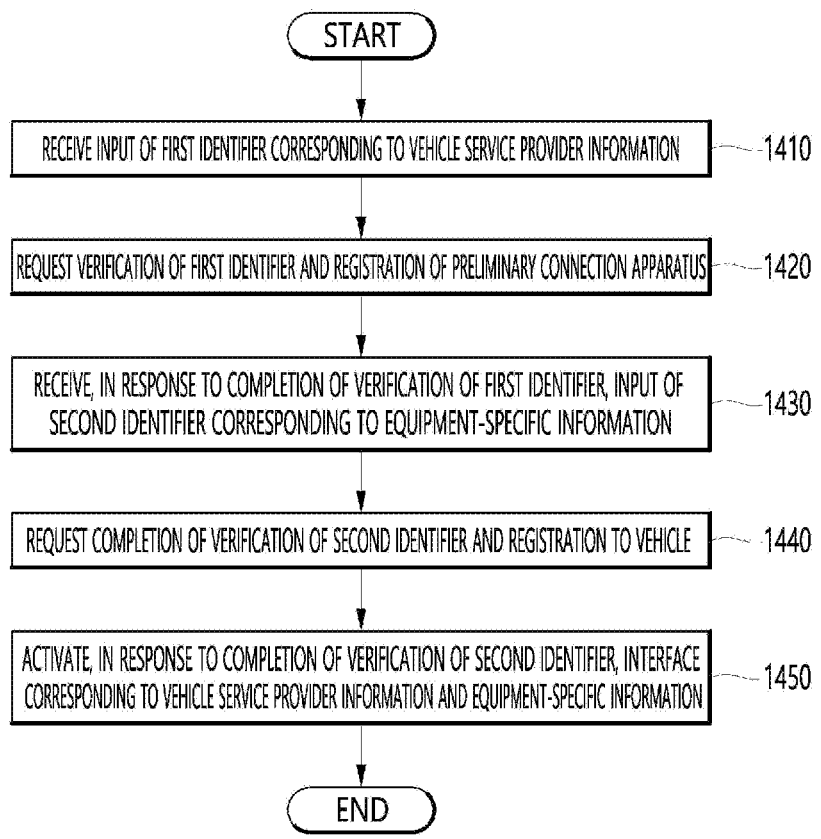
FIG. 14 is a flowchart of a connection method for vehicle operation service, according to an embodiment.

FIG. 14 is a flowchart of a connection method for vehicle operation service, according to an embodiment.

Operations illustrated in FIG. 14 may be performed by the aforementioned connection apparatus for vehicle operation. In detail, the operations illustrated in FIG. 14 may be performed by a processor included in the connection apparatus for vehicle operation described above.

In operation 1410, the processor may receive an input of a first identifier corresponding to vehicle service provider information.

In an embodiment, operation 1410 may include displaying a first identifier input interface including a first message display area, a first input data display area, and a first data input interface.

In an embodiment, operation 1410 may further include displaying a first identifier input waiting message in the first message display area, displaying inputted input data regarding a first identifier in the first input data display area, and in response to receiving a first identifier input completion signal, transmitting input data regarding the first identifier that has been input until the first identifier input completion signal is received.

In operation 1420, the processor may request verification of the first identifier and registration of a preliminary connection apparatus.

In operation 1430, the processor may receive, in response to completion of the verification of the first identifier, an input of a second identifier corresponding to equipment-specific information.

In an embodiment, operation 1430 may include displaying a second identifier input interface including a second message display area, a second input data display area, and a second data input interface.

In an embodiment, operation 1430 may further include displaying a second identifier input waiting message in the second message display area, displaying inputted input data regarding a second identifier in the second input data display area, and in response to receiving a second identifier input completion signal, transmitting input data regarding the second identifier that has been input until the second identifier input completion signal is received.

In an embodiment, the processor may display an unregistered corporation message in the first message display area, in response to a failure of the verification of the first identifier.

In operation 1440, the processor may request completion of verification of the second identifier and registration of a vehicle.

In operation 1450, the processor may activate, in response to completion of the verification of the second identifier, interfaces corresponding to the vehicle service provider information and the equipment-specific information.

In an embodiment, when a verification completion signal for the second identifier is received, the processor may determine that the verification of the second identifier is completed, and the verification completion signal for the second identifier may include an access token for communication.

In an embodiment, the processor may switch a vehicle state to a before-starting-work state, in response to completion of the verification of the second identifier.

In an embodiment, the processor may display a unique code mismatch message in the second message display area, in response to a failure of the verification of the second identifier.

Figure 15:
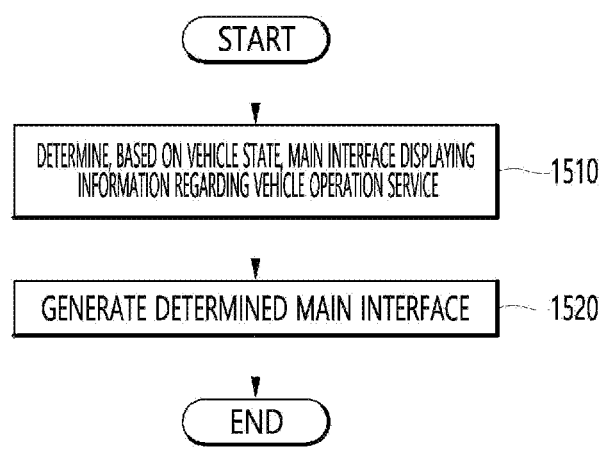
FIG. 15 is a flowchart of a method of providing a driver interface, according to an embodiment.

FIG. 15 is a flowchart of a method of providing a driver interface, according to an embodiment.

Operations illustrated in FIG. 15 may be performed by the aforementioned driver information providing apparatus. In detail, the operations illustrated in FIG. 15 may be performed by a processor included in the aforementioned driver information providing apparatus.

In operation 1510, the processor may determine, based on a vehicle state, a main interface displaying information regarding a vehicle operation service.

In an embodiment, operation 1510 may include determining a before-starting-work interface as the main interface, in response to the vehicle state being switched to a moving-to-workplace state, determining a moving-to-workplace interface as the main interface, and in response to the vehicle state being switched to a standby-for-dispatch state, determining a standby-for-dispatch interface as the main interface.

In an embodiment, when the vehicle is in a before-starting-work state, the vehicle state may be switched to the moving-to-workplace state in response to receiving an attendance authentication signal.

In an embodiment, when the vehicle is in the moving-to-workplace state, the vehicle state may be switched to the standby-for-dispatch state in response to a vehicle location entering an autonomous driving route.

In an embodiment, the before-starting-work interface may include a driving route interface, an interface including driver information and vehicle information, an attendance authentication interface, and an autonomous driving function state interface.

In an embodiment, the moving-to-workplace interface may include a driving route interface, a route guidance interface including destination information, navigation maps, and driving method guidance, and an autonomous driving function state interface.

In operation 1520, the processor may generate the determined main interface.

In an embodiment, after operation 1520, the processor may activate and display a first object capable of interaction in response to satisfying a predefined condition, deactivate and display the first object in response to not satisfying the predefined condition, and display a driver menu interface in response to receiving an input for interacting with the activated first object.

In an embodiment, the processor may display a rest guidance interface in response to remaining time until a scheduled rest time reaching a first time, the scheduled rest time being included in work setting data included in the driver information, switch the vehicle state to a moving-to-resting-area state when the vehicle is in the standby-for-dispatch state, switch the vehicle state to the moving-to-resting-area state in response to receiving an operation end signal when the vehicle is in an operating state, and determine a moving-to-resting-area interface as the main interface in response to the vehicle state being switched to the moving-to-resting-area state.

In an embodiment, the processor may display a rest end guidance interface in response to remaining time until a scheduled work time after resting reaching a second time, the scheduled work time after resting being included in the work setting data included in the driver information, and switch the vehicle state to the standby-for-dispatch state in response to the remaining time until the scheduled work time after resting reaching 0.

In an embodiment, the processor may display a work end guidance interface in response to remaining time until a work end time reaching a third time, the work end time being included in the work setting data included in the driver information, switch the vehicle state to a scheduled work end state in response to receiving the operation end signal when the vehicle is in the operating state, switch the vehicle state to the scheduled work end state when the vehicle is in the standby-for-dispatch state, switch the vehicle state to a moving-to-location-to-leave-work state in response to the remaining time until the work end time reaching 0, and determine a moving-to-location-to-leave-work interface as the main interface in response to the vehicle state being switched to the moving-to-location-to-leave-work state.

Figure 16:
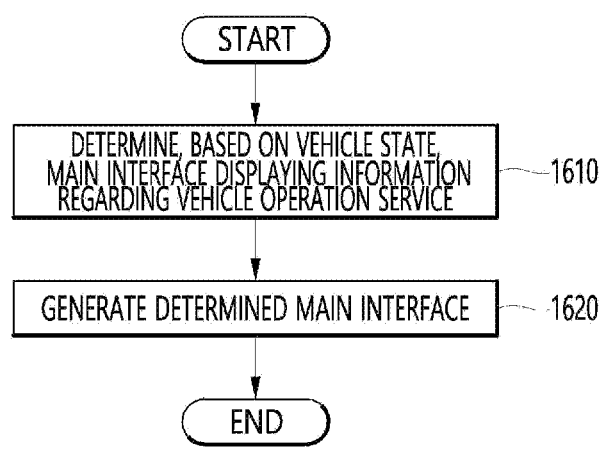
FIG. 16 is a flowchart of a method of providing a vehicle operation information interface, according to an embodiment.

FIG. 16 is a flowchart of a method of providing a vehicle operation information interface, according to an embodiment.

Operations illustrated in FIG. 16 may be performed by the aforementioned driver information providing apparatus. In detail, the operations illustrated in FIG. 16 may be performed by a processor included in the aforementioned driver information providing apparatus.

In operation 1610, the processor may determine a main interface displaying information regarding a vehicle operation service based on a vehicle state.

In an embodiment, operation 1610 may include determining a standby-for-dispatch interface as the main interface, and in response to a vehicle state being switched to a moving-to-pick-up-location state, determining a moving-to-pick-up-location interface as the main interface.

In an embodiment, the standby-for-dispatch interface may include a driving route interface configured to display a surrounding environment of a vehicle, a route guidance interface including navigation maps, a notification interface displaying notifications related to vehicle operation assignment, and an autonomous driving function state interface.

In an embodiment, when the vehicle is in a standby-for-dispatch state, the vehicle state may be switched to the moving-to-pick-up-location state in response to receiving a dispatch request signal.

In an embodiment, the moving-to-pick-up-location interface may include a driving route interface configured to display a surrounding environment of the vehicle, and a route guidance interface including destination information, navigation maps, and driving method guidance.

In an embodiment, the driving route interface may include an icon corresponding to the vehicle based on vehicle information, lanes generated based on road information received based on vehicle location information and lane information around the vehicle identified by a sensor mounted in the vehicle, an icon corresponding to another vehicle placed and generated at a relative location of the other vehicle with respect to the vehicle based on information about the other vehicle around the vehicle and location information about the other vehicle identified by a sensor mounted in the vehicle, and an icon corresponding to a pedestrian placed and generated at a relative location of the pedestrian with respect to the vehicle based on location information about the pedestrian around the vehicle identified by a sensor mounted in the vehicle information.

In an embodiment, the processor may switch the vehicle state to the moving-to-pick-up-location state when the vehicle is in the standby-for-dispatch state in response to receiving the dispatch request signal, and set a destination based on information included in the dispatch request signal.

In operation 1620, the processor may generate the determined main interface.

After operation 1620, the processor may display a seat information interface.

In an embodiment, the seat information interface may include a seat layout displaying an arrangement of a plurality of seats, and an indication of a seat state of each of the plurality of seats.

In an embodiment, the seat state may be one of a remaining state, a boarding-scheduled state, and a boarding-completed state.

After operation 1620, in response to interacting with an object of a seat whose seat state is a boarding-scheduled state or an object of a first seat in a boarding-completed state among the plurality of seats displayed in the seat layout, the processor may change a seat state of the first seat to a remaining seat, and in response to changing the state of the first seat to the remaining seat, change the object of the first seat to the remaining seat and display the object.

After operation 1620, the processor may display an arrival notification message and a pick-up location arrival completion object on the main interface in response to a distance between the vehicle and the destination being less than or equal to a first threshold distance, display a boarding completion object and a timer counting down a certain amount of time on the main interface in response to interacting with the pick-up location arrival completion object, switch the vehicle state to a moving-to-drop-off-location state in response to receiving a boarding completion signal, and switch the vehicle state to the standby-for-dispatch state in response to not receiving the boarding completion signal until the certain amount of time elapses.

Figure 17:
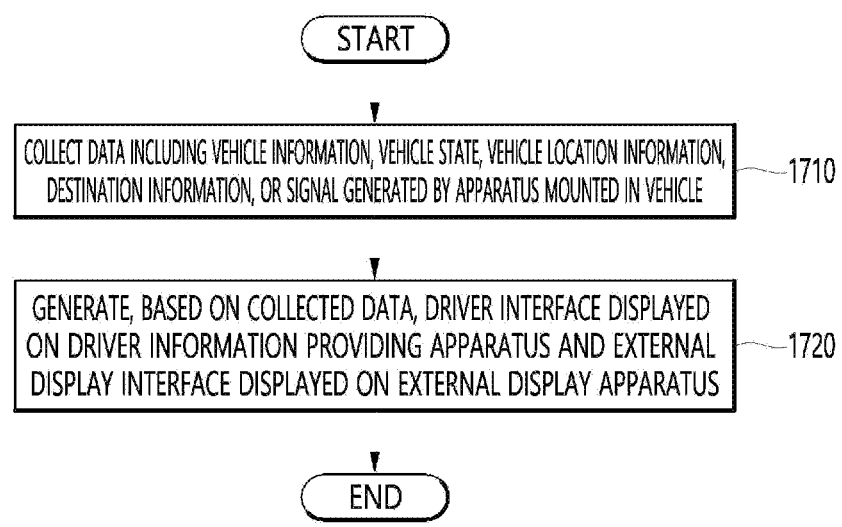
FIG. 17 is a flowchart of a method of providing an interface for vehicle operation, according to an embodiment.

FIG. 17 is a flowchart of a connection method for vehicle operation service, according to an embodiment.

Operations illustrated in FIG. 17 may be performed by the aforementioned driver information providing apparatus or an external display apparatus. In detail, the operations illustrated in FIG. 17 may be performed by a processor included in the aforementioned driver information providing apparatus or external display apparatus.

In operation 1710, data including vehicle information, a vehicle state, vehicle location information, destination information, or a signal generated by an apparatus mounted in a vehicle may be collected.

In operation 1720, a driver interface displayed on the driver information providing apparatus and an external display interface displayed on the external display apparatus may be generated based on the collected data.

In an embodiment, after operation 1720, receiving, by the external display apparatus, the vehicle location information, determining that the received vehicle location information has entered a specific area, and generating, in response to the determination, a message notifying that the vehicle has entered the specific area may be performed. The generating of the external display interface may include generating an external display interface.

In an embodiment, the specific area may be a children protection zone, and the external display interface may be generated to include a manual driving mode switching notification message, in response to an operating mode of the vehicle being switched to a manual driving mode.

In an embodiment, the external display apparatus may include a front external display apparatus and a rear external display apparatus, and the external display interface may include a front external display interface and a rear external display interface.

In an embodiment, in response to the vehicle being in a standby-for-dispatch state or a moving-to-pick-up-location state, the front external display interface may display a vehicle name and a circuit route name, and the rear external display interface may display a message indicating that the vehicle is in operation.

In an embodiment, in response to interacting with a pick-up location arrival completion object, the rear external display interface may display a message indicating that a passenger is boarding, and in response to receiving a boarding completion signal, the rear external display interface may display a message indicating that the vehicle is in operation.

In an embodiment, in response to the vehicle entering the children protection zone, the rear external display interface may display a children protection zone entry notification message.

Figure 18:
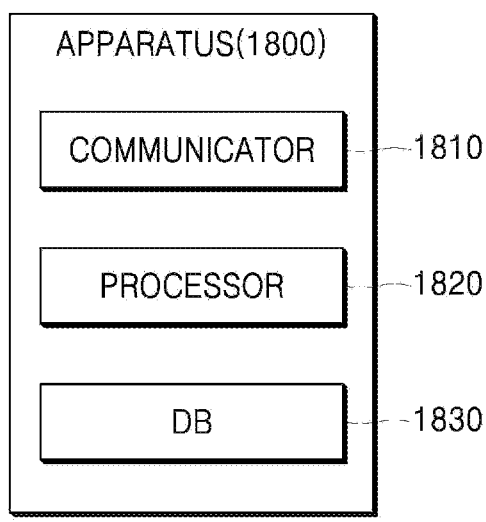
FIG. 18 is a block diagram of an apparatus according to an embodiment.

FIG. 18 is a block diagram of an apparatus according to an embodiment.

The apparatus of FIG. 18 may correspond to the aforementioned connection apparatus for vehicle operation service, driver interface providing apparatus, vehicle operation information interface providing apparatus, or interface providing apparatus for vehicle operation.

Referring to FIG. 18, an apparatus 1800 may include a communicator 1810, a processor 1820, and a database (DB) 1830. In the apparatus 1800 of FIG. 18, only components related to the embodiment are shown. Accordingly, one of ordinary skill in the art may understand that other general-purpose components may be further included, in addition to the components shown in FIG. 18.

The communicator 1810 may include one or more components that enable wired/wireless communication with an external server or an external apparatus. For example, the communicator 1810 may include at least one of a short-range communicator (not shown), a mobile communicator (not shown), and a broadcast receiver (not shown).

The DB 1830 is hardware storing various pieces of data processed in the apparatus 1800 and may store programs for processing and controlling of the processor 1820. The DB 1830 may store payment information, user information, etc.

The DB 1830 may include random access memory (RAM) such as dynamic random RAM (DRAM) and static RAM (SRAM), read-only memory (ROM), electrically erasable programmable ROM (EEPROM), compact disc (CD)-ROM, Blu-ray or other optical disk storage, a hard disk drive (HDD), a solid state drive (SSD), or flash memory.

The processor 1820 controls the overall operation of the apparatus 1800. For example, the processor 1820 may generally control an inputter (not shown), a display (not shown), the communicator 1810, the DB 1830, etc., by executing the programs stored in the DB 1830. The processor 1820 may control the operations of the apparatus 1800 by executing the programs stored in the DB 1830.

The processor 1820 may control at least some of the operations of the apparatus 1800 described above with reference to FIGS. 1 to 17.

The processor 1820 may be implemented by using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electric units for performing other functions.

In an embodiment, the apparatus 1800 may be a mobile electronic apparatus. For example, the apparatus 1800 may be implemented as a smart phone, a tablet PC, a PC, a smart TV, a PDA, a laptop computer, a media player, a navigation apparatus, a camera-mounted device, or other mobile electronic apparatuses. Also, the apparatus 1800 may be implemented as a wearable apparatus, such as a watch, glasses, a hairband, and a ring having a communication function and a data processing function.

In another embodiment, the apparatus 1800 may be an electronic apparatus embedded in a vehicle. For example, the apparatus 1800 may be an electronic apparatus inserted into a vehicle through tuning after a production process.

In another embodiment, the apparatus 1800 may be a server located outside a vehicle. The server may be implemented as a computer apparatus or a plurality of computer apparatuses that communicate over a network to provide commands, code, files, content, services, or the like. The server may receive data necessary for determining a movement route of a vehicle from apparatuses mounted in the vehicle and determine the movement route of the vehicle based on the received data.

In another embodiment, a process performed by the apparatus 1800 may be performed by at least some of a mobile electronic apparatus, an electronic apparatus embedded in a vehicle, and a server located outside the vehicle.

According to the aforementioned technical solutions of the disclosure, a demand-responsive system may be efficiently operated. In addition, because an interface that is appropriately switched according to a vehicle state may be displayed, pleasant and efficient work and demand-responsive vehicle service may be provided to drivers.

The embodiment of the disclosure may be implemented in the form of a computer program that may be executed on a computer through various components, and the computer program may be recorded on a computer-readable medium. In this case, the computer-readable medium may include a magnetic medium such as a hard disk, a floppy disk, and a magnetic tape, an optical recording medium such as CD-ROM and a digital video disc (DVD), a magneto-optical medium such as a floptical disk, and a hardware apparatus specifically configured to store and execute program instructions, such as ROM, RAM, and flash memory.

Moreover, the computer program may be specifically designed and configured for the disclosure or may be well-known and available to one of ordinary skill in the art of the computer software field. Examples of the computer program include high-level language code that may be executed by a computer by using an interpreter or the like as well as machine language code generated by a compiler.

According to an embodiment, a method according to various embodiments of the disclosure may be included and provided in a computer program product. The computer program products are products that may be traded between sellers and buyers. The computer program product may be distributed in the form of a machine-readable storage medium (e.g., CD-ROM), or be distributed (e.g., downloaded or uploaded) online via an application store (e.g., Play Store™), or between two user apparatuses directly. When distributed online, at least part of the computer program product may be temporarily generated or at least temporarily stored in the machine-readable storage medium, such as memory of the manufacturer's server, a server of the application store, or a relay server.

The operations constituting the method according to the disclosure may be performed in any suitable order unless the order is explicitly stated or stated to the contrary. The embodiments of the disclosure are not necessarily limited according to the order of description of the operations. All examples or illustrative terms (e.g., etc.) used herein are simply to explain the embodiments of the disclosure in detail, and the scope of the disclosure is not limited by the above examples or illustrative terms unless limited by the claims. In addition, one of ordinary skill in the art may appreciate that various modifications, combinations, and changes may be made according to design conditions and factors within the scope of the appended claims or equivalents thereof.

Therefore, the spirit of the disclosure should not be limited to the aforementioned embodiments, and it will be understood that the following claims as well as all the equivalents or equivalent modifications of these claims are within the scope of the spirit of the disclosure.

The invention claimed is:

1. A method of providing a driver interface, the method comprising:
    based on a state of a vehicle, determining a main interface configured to display information regarding a vehicle operation service; and
    generating the determined main interface,
    wherein the determining of the main interface comprises:
    determining a before-starting-work interface as the main interface;
    in response to the state of the vehicle being switched to a moving-to-workplace state, determining a moving-to-workplace interface as the main interface; and
    in response to the state of the vehicle being switched to a standby-for-dispatch state, determining a standby-for-dispatch interface as the main interface,
    wherein the state of the vehicle is, when the vehicle is in a before-starting-work state, in response to receiving an attendance authentication signal, switched to the moving-to-workplace state, and when the vehicle is in the moving-to-workplace state, in response to a location of the vehicle entering an autonomous driving route, switched to the standby-for-dispatch state.

2. The method of claim 1, wherein the before-starting-work interface comprises:
    a driving route interface;
    an interface including information about a driver and information about the vehicle;
    an attendance authentication interface; and
    an autonomous driving function state interface.

3. The method of claim 1, wherein the moving-to-workplace interface comprises:
    a driving route interface;
    a route guidance interface including information regarding a destination, a navigation map, and a driving method guidance; and
    an autonomous driving function state interface.

4. The method of claim 1, further comprising:
    in response to satisfying a predefined condition, activating and displaying a first object capable of interaction;
    in response to not satisfying the predefined condition, deactivating and displaying the first object; and
    in response to receiving an input for interacting with the activated first object, displaying a driver menu interface.

5. The method of claim 1, further comprising:
    in response to a remaining time until a scheduled rest time reaching a first time, the scheduled rest time being included in work setting data included in the information about the driver, displaying a rest guidance interface;
    when the state of the vehicle is the standby-for-dispatch state, switching the state of the vehicle to a moving-to-resting-area state;
    when the state of the vehicle is an operating state, in response to receiving an operation end signal, switching the state of the vehicle to the moving-to-resting-area state; and
    in response to the state of the vehicle being switched to the moving-to-resting-area state, determining a moving-to-resting-area interface as the main interface.

6. The method of claim 5, further comprising:
    in response to a remaining time until a scheduled work time after resting reaching a second time, the scheduled work time after resting being included in the work setting data included in the information about the driver, displaying a rest end guidance interface; and
    in response to the remaining time until the scheduled work time after resting reaching 0, switching the state of the vehicle to the standby-for-dispatch state.

7. An apparatus for providing a driver interface, the apparatus comprising:
    a memory storing at least one program; and
    a processor configured to operate by executing the at least one program,
    wherein the processor is configured to,
    based on a state of a vehicle, determine a main interface configured to display information regarding a vehicle operation service, and
    generate the determined main interface,
    wherein the determining of the main interface comprises determining a before-starting-work interface as the main interface, in response to the state of the vehicle being switched to a moving-to-workplace state, determining a moving-to-workplace interface as the main interface, and in response to the state of the vehicle being switched to a standby-for-dispatch state, determining a standby-for-dispatch interface as the main interface,
    wherein the state of the vehicle is, when the vehicle is in a before-starting-work state, in response to receiving an attendance authentication signal, switched to the moving-to-workplace state, and when the vehicle is in the moving-to-workplace state, in response to a location of the vehicle entering an autonomous driving route, switched to the standby-for-dispatch state.

8. A non-transitory computer-readable recording medium having recorded thereon a program for executing the method of claim 1, on a computer.

* * * * *